(12) United States Patent
Matsugu et al.

(10) Patent No.: US 6,453,069 B1
(45) Date of Patent: *Sep. 17, 2002

(54) METHOD OF EXTRACTING IMAGE FROM INPUT IMAGE USING REFERENCE IMAGE

(75) Inventors: Masakazu Matsugu, Chiba; Tatsushi Katayama, Tokyo; Koji Hatanaka, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 57 days.

(21) Appl. No.: 08/972,166

(22) Filed: Nov. 17, 1997

(30) Foreign Application Priority Data

Nov. 20, 1996 (JP) .............................. 8-323299
May 19, 1997 (JP) .............................. 9-142955

(51) Int. Cl.⁷ .............................................. G06K 9/48
(52) U.S. Cl. ...................................... 382/173; 382/199
(58) Field of Search ................................ 382/199, 266, 382/103, 291, 180, 107, 164, 173, 282–283, 224, 251, 165, 276; 358/452–453, 537–538; 345/626; 348/699–700, 14.15

(56) References Cited

U.S. PATENT DOCUMENTS

| | | | |
|---|---|---|---|
| 4,882,622 A | 11/1989 | Uzuda et al. ............... | 358/538 |
| 4,958,217 A | 9/1990 | Kimura et al. .............. | 358/538 |
| 5,355,446 A * | 10/1994 | Maayan ...................... | 345/626 |
| 5,471,535 A | 11/1995 | Ikezawa et al. ............. | 382/199 |
| 5,519,436 A | 5/1996 | Manson .................... | 348/14.15 |
| 5,557,685 A * | 9/1996 | Schlossers et al. ......... | 382/107 |
| 5,598,482 A * | 1/1997 | Balasubramanian ........ | 382/199 |
| 5,768,438 A | 6/1998 | Etoh ......................... | 382/251 |
| 5,818,962 A * | 10/1998 | Mizukami .................. | 382/180 |
| 5,875,040 A * | 2/1999 | Matraszek et al. .......... | 358/453 |
| 5,881,171 A * | 3/1999 | Kinjo ......................... | 382/199 |
| 6,167,167 A * | 12/2000 | Matsugu et al. ............ | 382/283 |

FOREIGN PATENT DOCUMENTS

| | | | |
|---|---|---|---|
| EP | 0 400 998 A | 12/1990 | ............ H04N/5/14 |
| EP | 0 532 823 | 3/1993 | ............ G06F/15/68 |
| EP | 0 634 872 A | 1/1995 | ............ H04N/7/24 |
| EP | 0 671 706 A | 9/1995 | ............ G06T/1/00 |
| EP | 0 706 155 A1 | 10/1996 | ............ G06T/9/00 |

OTHER PUBLICATIONS

European Search Report dated Feb. 24, 2000.

Huang Q. etal: (1995) "Foreground/Background Segmentation of Color Images by Integration of Multiple Cues"; *IEEE*; pp. 246–249.

Waldowski M.: (1991) "A New Segmentation Algorithm for Videophone Applications Based on Stereo Image Pairs"; *Transactions on Communications*, vol. 39, No. 12; pp. 1857–1868.

(List continued on next page.)

Primary Examiner—Leo Boudreau
Assistant Examiner—Ishrat Sherali
(74) Attorney, Agent, or Firm—Morgan & Finnegan, LLP

(57) ABSTRACT

This invention relates to an image processing method for precisely and automatically recognizing a specific image extraction region to be divided from an input image, and extracting the specific image extraction region. Thresholding is done for intensity differences of edge data obtained from the input data to extract difference edge data. A main extraction region is estimated from the outermost contour line extracted based on the extraction result of the difference edge data. Thresholding or the like is done in units of pixels of the input image to extract an initial region. Extraction region determination processing is done for extracting an accurate target region by combining the main extraction region and initial region.

18 Claims, 25 Drawing Sheets

OTHER PUBLICATIONS

Kim C.: "Moving Target Extraction Algorithm for Selective Coding"; *SPIE* vol. 2727, pp. 1130–1139.

Yemez Y.: (1996) "Region Growing Motion Segmentation and Estimation in Object–Oriented Video Coding", *IEEE*, pp. 521–524.

Chu C–C., etal.: (1993) "The Integration of Image Segmentation Maps Using Region and Edge Information", *IEEE Transactions on Pattern Analysis and Machine Intellingence*; vol. 15, No. 12, pp. 1241–1251.

Cortez D. et al.: "Image Segmentation Towards New Image Representation Methods" Signal Processing. Image Communication, vol. 6, No. 6, pp. 485–498, XP000491855 (Feb. 1, 1995).

Lettera C. et al.: "Foreground/Background Segmentation in Videotelephony" Signal Processing .Image Communication, vol. 1, No. 2, pp. 181–189, XP000234867 (Oct. 1, 1989).

Kass M. et al.: "Snakes: Active Contour Models," International Journal of Computer Vision, pp. 321–331, XP000675014 (1988).

Gambotto J–P: "A New Approach To Combining Region Growth And Edge Detection," Pattern Recognition Letters, vol. 14, No. 11, pp. 869–875, XP000403545 (Nov. 1, 1993).

Office Action dated May 21, 1999 in U.S. patent appln Ser. No. 08/886,076 filed on Jul. 2, 1997.

European Search Report, dated Jul. 5, 1999.

* cited by examiner

INPUT SUBJECT IMAGE

INPUT BACKGROUND IMAGE

AFTER INITIAL SEED EXTRACTION

AFTER MAXIMUM REGION GROWING RANGE IS SET

MAXIMUM GROWING RANGE (WITHIN DOTTED LINE)

AFTER REGION GROWING (BEFORE HOLE FILLING)

EXTRACTED IMAGE

TARGET IMAGE

CORRESPONDING POINT SEARCH RANGE

REFERENCE IMAGE

CORRESPONDING POINT SEARCH RANGE

45°DIRECTION LABEL    −45°DIRECTION LABEL

HORIZONTAL DIRECTION LABEL / VERTICAL DIRECTION LABEL
FRAME AFTER AUTO-FRAMING ( LABEL DIRECTION : —, |, ╱, ╲, )

MODEL IMAGE

SIZE-CHANGED MODEL IMAGE

TARGET IMAGE LINE LABEL
DATA AFTER FRAMING

SIZE-CHANGED MODEL
IMAGE LINE LABEL DATA

REGION WITH HIGH DEGREE
OF LABEL MATCHING

REGION WITH HIGH DEGREE
OF LABEL MATCHING

CONTOUR LINE OF REGION
WITH HIGH DEGREE
OF LABEL MATCHING

CONTOUR LINE OF MODEL
IMAGE DEFINED BY LABELED
LABEL LINE SEGMENTS

TARGET IMAGE

REFERENCE IMAGE

≡ HORIZONTAL DIRECTION LABEL
▨ 45° DIRECTION LABEL
▥ VERTICAL DIRECTION LABEL
▧ −45° DIRECTION LABEL

TARGET IMAGE

FRAME AFTER FRAMING

REFERENCE IMAGE

- ▬ HORIZONTAL DIRECTION LABEL
- ▨ 45° DIRECTION LABEL
- ▥ VERTICAL DIRECTION LABEL
- ▧ −45° DIRECTION LABEL

LABEL BOUNDARY POSITION

CONTOUR LINE (DOTTED LINE) OF OBJECT TO BE EXTRACTED

PORTION OF BACKGROUND CONTOUR LINE

END POINT

TARGET IMAGE

REPRESENTATIVE BACKGROUND IMAGE

SINGULAR CONTOUR LINE

SINGULAR REGION (INITIAL SEED)

EXTRACTION RESULT

MAIN SCANNING DIRECTION

METHOD OF EXTRACTING IMAGE FROM INPUT IMAGE USING REFERENCE IMAGE

BACKGROUND OF THE INVENTION

The present invention relates to an image segmentation method for segmenting the image region to be extracted from an input image using a reference image, an image identification method for identifying the image region to be extracted from an input image using a reference image, an image segmentation apparatus, an image processing apparatus and method for extracting a specific image region from an image, and a storage medium storing the image processing method.

As general techniques for implementing image extraction, a chromakey method using a specific color background, a videomatte method for generating a key signal by predetermined image processing (histogram processing, difference processing, differential processing, contour enhancement, contour tracing, and the like) (*The Television Society Technical Report*, Vol. 12, pp. 29–34, 1988), and the like are known.

A technique for performing image extraction based on the difference from the background image is a state-of-the-art one, and for example, Japanese Patent Laid-Open No. 4-216181 discloses a technique for detecting or extracting a target object in a plurality of specific regions in an image by setting a mask image (specific processing region) in difference data between the background image and the image to be processed. Furthermore, Japanese Patent Publication No. 7-16250 discloses a technique that uses a color model of the object to be extracted to implement image extraction by obtaining the existence probability distribution of the object to be extracted from color-converted data of an original image including background and lightness difference data between the background image and the original image.

In the difference method from the background image, the luminance level or color component difference between the pixels of the background image and the subject image is normally expressed by a predetermined evaluation function, and the evaluation function is subjected to thresholding to extract a region having a difference level equal to or higher than a predetermined value. As the evaluation function, the correlation between blocks having individual points as centers and a predetermined size (Rosenfeld, A. and Kak, A. C., Digital Picture Processing (2nd ed.), Academic Press, 1982), a normalized principal component features (*Journal of the Institute of Electronics, Information and Communication Engineers*, Vol. J74-D-II, pp. 1731–1740), a weighted sum value of a standard deviation and a difference value (*Journal of the Television Society*, Vol. 45, pp. 1270–1276, 1991), a local histogram distance associated with hue and luminance level (*Journal of the Television Society*, Vol. 49, pp. 673–680, 1995), and the like are used.

As a technique for identifying or recognizing a specific object, the following method is popularly used. That is, a model image or template associated with that object is prepared in advance. An image region of the object to be identified is separated from other regions, the size of the image region to be identified is normalized or its position is fixed, or a plurality of model images having different sizes are prepared. Scanning a target image, the similarities between the model image or template and the object to be identified are determined using a measure such as correlation or the like.

The background difference method poses a problem when a partial region which has a similar luminance, color, or pattern to the background image is included in the object to be extracted. In this case, since no difference in that region is estimated between the background image and the input image including the object to be extracted, extraction or detection errors take place. As a step against such problem, Japanese Patent Laid-Open No. 8-44844 adopts a method of calculating the gradients of both the background image and the input image, and taking logical OR of the difference absolute value between the gradients and that of image signals. On the other hand, Japanese Patent Laid-Open No. 8-212350 adopts a method of performing thresholding by calculating a feature, the rate of its change with respect to changes in pixel density of the input image of which decreases when the background image has a middle pixel density, and increases when the background image has a high or low pixel density.

However, in image extraction, the chromakey method is hard to use outdoors due to serious background limitations such as a requirement for a specific color background, and causes color omissions in the subject region having the same color as the background. On the other hand, in the videomatte method, since contour designation must be manually and accurately performed in units of pixels, such operation requires much labor and skill.

Furthermore, in the background difference method, the background is hard to distinguish from the subject in a partial region of the subject similar to the background, and this method does not normally allow image sensing condition differences (e.g., the exposure condition, magnification, illumination condition, focusing condition, view point position, and the like) between the background image and input image. Especially, when background obtained by removing the subject from the input image is different from the background image, the tolerance to their difference is considerably low even if they are similar to each other. In addition, it is very hard to extract contour and three-dimensional shape details of the subject while removing the noise influence.

Also, the background difference method requires distinct image characteristic differences (e.g., pixel values and the like) between the background image and the subject region everywhere, and it is hard to apply the method to a general background. Even in the methods that take a step against the partial region of the subject similar to the background (Japanese Laid-Open Patent Nos. 8-44844 and 8-212350), for example, when the rate of spatial change in pixel value is small, the subject is hardly or insufficiently distinguished from the background. Hence, it is difficult to stably maintain high extraction precision by automatic processing in a practical use.

When the shadow of the object to be extracted is present in the image in the vicinity of the object, it is hard for either method to extract the image region to be extracted alone and to automatically remove the shadow.

Furthermore, in the method of identifying or recognizing a specific target image, the segmentation processing from other regions in the above-mentioned pre-processing normally constitutes in separable parts and is complicated and hard to attain. On the recognition technique, also, it is difficult to automatically normalize the size, position, and the like since the size and position of the object to be recognized are not detected in advance. Furthermore, the number of model images having different sizes that can be prepared is limited due to storage capacity limitations on the database, resulting in poor versatility.

SUMMARY OF THE INVENTION

It is, therefore, the first object of the present invention to provide an image segmentation method, which can precisely and automatically detect the existence range of an intruder in the input image, and can precisely detect the existence range of the object to be extracted or recognized.

It is the second object of the present invention to provide an image segmentation method which can stably extract an image from the input image even when the reference image and the input image have differences resulting from variations of the image sensing condition, illumination condition, and the like therebetween.

It is the third object of the present invention to provide an image identification method and apparatus, which can stably and automatically recognize the object to be recognized without being influenced by any differences of the image size and position of a subject, and are excellent in terms of economy.

It is the fourth object of the present invention to provide an image segmentation method which can perform high-speed image extraction while removing the influences of noise such as shading.

It is the fifth object of the present invention to provide an image segmentation method and apparatus, which can perform image extraction with high tolerance to differences between the reference image and the background portion of the input image.

It is the sixth object of the present invention to provide an image processing apparatus and method, and a storage medium that stores the method, which can precisely extract a specific image region from a main image which includes a specific image region to be extracted and a sub image which does not include any specific image region to be extracted.

It is the seventh object of the present invention to provide an image processing apparatus and method, and a storage medium that stores the method, which can precisely extract a specific image region even when the specific image region to be extracted includes a region similar to an image which is not to be extracted.

It is the eighth object of the present invention to provide an image processing apparatus and method, and a storage medium that stores the method, which can precisely extract a specific image region even when an image which is similar to the specific image to be extracted but is not to be extracted is present in the vicinity of the specific image region to be extracted.

It is the ninth object of the present invention to provide an image processing apparatus and method, and a storage medium that stores the method, which can precisely extract a specific image region even when the specific image region to be extracted includes many regions similar to an image which is not to be extracted.

It is the tenth object of the present invention to provide an image processing apparatus and method, and a storage medium that stores the method, which can precisely extract a specific image region even when the specific image region to be extracted includes hole regions.

It is the eleventh object of the present invention to provide an image processing apparatus and method, and a storage medium that stores the method, which can precisely extract a specific image region at high speed by inputting a rough shape of the specific region to be extracted in advance.

In order to solve the above problems and to achieve the above objects, the present invention comprises the following arrangement.

More specifically, there is provided an image segmentation method for segmenting an object, which is not present in a reference image, from an input image including the object using the reference image, comprising:

the edge intensity distribution extraction step of extracting edge intensity distributions in the reference image and input image;

the direction-classified line detection step of detecting line components in terms of predetermined directions for edges in the reference image and input image on the basis of the extracted edge intensity distributions; and the image region specifying step of specifying an existence range of the object in the input image on the basis of a distribution of differences between the detected line components in terms of directions between the reference image and input image.

This image segmentation method can precisely and automatically detect the existence region of an intruder object in the input image, and can precisely detect the existence range of the object to be extracted or recognized.

Since the existence range of an object in the input image is specified on the basis of the distribution of line components in terms of directions, the existence region can be detected more accurately by removing the influences of, e.g., shading.

In order to achieve the above objects, according to the present invention, there is provided an image segmentation method using a reference for segmenting a predetermined image region from an input image input from an external device such as an image input device, comprising:

the edge distribution extraction step of extracting edge distributions in the input image and reference image;

the direction-classified line detection step of detecting line distributions in terms of predetermined directions in the input image and reference image on the basis of the extracted edge distributions;

the singular edge extraction step of extracting a singular edge on the basis of a difference between the detected line distributions in units of directions between the reference image and input image; and the image extraction step of extracting the predetermined image region in the input image on the basis of the extracted singular edge.

This image segmentation method can stably extract an image from the input image even when the reference image and the input image have differences resulting from variations of the image sensing condition, illumination condition, and the like therebetween.

In order to achieve the above objects, according to the present invention, there is provided an image identification method for identifying an object, which is not present in a reference image, in an input image including the object using a standard model image representing a predetermined object and the reference image, comprising:

the edge intensity distribution extraction step of extracting edge intensity distributions in the reference image and input image;

the direction-classified line detection step of detecting line components in terms of predetermined directions for edges in the reference image and input image on the basis of the extracted edge intensity distributions;

the auto-framing step of specifying an existence range of the object in the input image on the basis of a distribution of differences between the detected line components in units of directions between the reference image and input image; and the model size estimation step of estimating a size with respect to the standard model image on the basis of the specified existence range of the object, wherein a size of the standard model image is changed to the estimated size, and thereafter, the object is identified on the basis of similarity between the object image present in the existence range in the input image and the size-changed standard model image.

This image identification method allows stable and automatic recognition of the object to be recognized without being influenced by the image size and position differences of a subject. Also, since standard model images having different sizes need not be stored, an economical advantage can also be expected.

In order to achieve the above objects, according to the present invention, there is provided an image segmentation method for segmenting an object, which is not present in a reference image, from an input image including the object using the reference image, comprising:

the edge intensity distribution extraction step of extracting edge intensity distributions in the reference image and input image;

the direction-classified line detection step of detecting line components in terms of predetermined directions for edges in the reference image and input image on the basis of the extracted edge intensity distributions;

the auto-framing step of specifying an existence range of the object in the input image on the basis of a distribution of differences between the detected line components in terms of directions between the reference image and input image; and the extraction processing step of performing extraction processing of the object within the specified existence range of the object.

This image segmentation method can extract an image at high speed while removing the influences of noise such as shading.

In order to achieve the above objects, according to the present invention, there is provided an image segmentation method for segmenting an image region to be extracted from an input image using a reference image that represents a region approximating a remaining region excluding the image region to be extracted, comprising:

the edge intensity distribution extraction step of extracting edge intensity distributions in the reference image and input image;

the direction-classified line detection step of detecting line components in terms of predetermined directions for edges in the reference image and input image on the basis of the extracted edge intensity distributions;

the singular contour extraction step of extracting a singular contour portion of the image region to be extracted on the basis of a distribution of the detected line components in terms of directions in the reference image and input image; and the image extraction step of extracting the image region to be extracted on the basis of distribution data representing the extracted singular contour portion.

This image segmentation method can extract only a contour inherent to a subject by absorbing differences such as a positional offset, rotational offset, distortion, and the like between the reference image and the background portion of the input image if they are present, and can achieve image extraction with high tolerance to the differences between the reference image and the background portion of the input image.

In order to achieve the above objects, according to the present invention, there is provided an image segmentation method for segmenting an image region to be extracted from an input image using a reference image that represents a region approximating a remaining region excluding the image region, comprising:

the low-resolution image extraction step of extracting low-resolution image portions in the input image and reference image;

the image matching step of performing matching corresponding points between the input image and reference image;

the dominant line map extraction step of segmenting the input image and reference image into a plurality of blocks and detecting dominant line direction components in the blocks; and the extraction step of extracting the image region on the basis of a degree of matching between a label in terms of directions of each edge of the input image and a label of the dominant line map of the reference image at the edge position.

This image segmentation method can achieve image extraction with high tolerance to differences between the reference image and the background portion of the input image. For example, even when the background portion of the input image and the corresponding region in the reference image are substantially different scenes but have high similarity, or when the input image and the reference image have different photographing conditions or photographing means, image extraction can be performed with high precision.

In order to achieve the above objects, according to the present invention, there is provided an image segmentation apparatus for segmenting an image region to be extracted from an input image using a reference image that represents a region approximating a remaining region excluding the image region, comprising:

storage means for storing the reference image;

edge extraction means for extracting edge distributions in the input image and reference image;

direction-classified line detection means for detecting line distributions in terms of directions in the input image and reference image on the basis of the extracted edge distributions;

corresponding point extraction means for extracting corresponding point information between the reference image and input image;

transformation means for geometrically transforming one of the input image and reference image on the basis of the extracted corresponding point information;

singular edge extraction means for extracting a singular edge on the basis of a line distribution difference in units of directions between the geometrically transformed image, and the other image; and segmentation means for segmenting the image region to be extracted from the input image on the basis of the extracted singular edge.

This image segmentation apparatus can extract only a contour inherent to a subject by absorbing differences such as a positional offset, rotational offset, distortion, and the like between the reference image and the background portion of the input image if they are present, and can achieve image extraction with high tolerance to the differences between the reference image and the background portion of the input image.

In order to achieve the above objects, according to the present invention, there is provided an image identification apparatus for identifying an object in an input image including the object which is not present in a reference image using a standard model image representing a predetermined object and the reference image, comprising:

edge intensity distribution extraction means for extracting edge intensity distributions in the reference image and input image;

direction-classified line detection means for detecting line components in terms of predetermined directions for edges in the reference image and input image on the basis of the extracted edge intensity distributions;

auto-framing means for specifying an existence range of the object in the input image on the basis of a distribution of differences between the detected line components in terms of directions between the reference image and input image; and model size estimation means for estimating a size with respect to the standard model image on the basis of the specified existence range of the object, wherein a size of the standard model image is changed to the estimated size, and thereafter, the object is identified on the basis of similarity between the object image present in the existence range in the input image and the size-changed standard model image.

This image identification apparatus can stably and automatically recognize the object to be recognized without being influenced by the image size and position differences of a subject since it changes the size of a standard model image to the required size, and thereafter, identifies an object on the basis of the similarity between an object image present in the existence range in the input image and the standard model image, the size of which has changed. Furthermore, since standard model images having different sizes need not be stored, an economical advantage can also be expected.

In order to achieve the above objects, according to the present invention, there is provided an image processing apparatus comprising:

image input means for inputting a plurality of images including a main image including a specific image region to be extracted, and a sub image which does not include any specific image region to be extracted;

edge distribution extraction means for extracting edge distributions of the plurality of images;

main extraction region estimation means for estimating a main extraction region in the main image on the basis of a difference between the plurality of edge distributions; and region specifying means for extracting or tracing the specific image region on the basis of the main extraction region and the plurality of images.

This image processing apparatus can precisely extract a specific image region from a main image including the specific image region to be extracted and a sub image which does not include any specific image region.

In order to achieve the above objects, according to the present invention, there is provided an image processing apparatus comprising:

image input means for inputting a plurality of images including a main image including a specific image region to be extracted, and a sub image which does not include any specific image region to be extracted;

edge distribution extraction means for extracting edge distributions of the plurality of images;

difference edge image extraction means for extracting difference data of the plurality of edge distributions;

outermost contour line extraction means for obtaining an outermost contour line by tracing an outermost line of the difference data;

main extraction region estimation means for estimating a main extraction region in the main image on the basis of the outermost contour line; and region specifying means for extracting or tracing the specific image region on the basis of the main extraction region and the plurality of images.

This image processing apparatus can precisely extract a specific image region even when the specific image region to be extracted includes a region similar to an image which is not to be extracted.

In order to achieve the above objects, according to the present invention, there is provided an image processing method comprising:

the image input step of inputting a plurality of images including a main image including a specific image region to be extracted, and a sub image which does not include any specific image region to be extracted;

the edge distribution extraction step of extracting edge distributions of the plurality of images;

the main extraction region estimation step of estimating a main extraction region in the main image on the basis of a difference between the plurality of edge distributions; and the region specifying step of extracting or tracing the specific image region on the basis of the main extraction region and the plurality of images.

This image processing method can precisely extract a specific image region from a main image including the specific image region to be extracted and a sub image which does not include any specific image region.

In order to achieve the above objects, according to the present invention, there is provided an image processing method comprising:

the image input step of inputting a plurality of images including a main image including a specific image region to be extracted, and a sub image which does not include any specific image region to be extracted;

the edge distribution extraction step of extracting edge distributions of the plurality of images;

the difference edge image extraction step of extracting difference data of the plurality of edge distributions;

the outermost contour line extraction step of obtaining an outermost contour line by tracing an outermost line of the difference data;

the main extraction region estimation step of estimating a main extraction region in the main image on the basis of the outermost contour line; and the region specifying step of extracting or tracing the specific image region on the basis of the main extraction region and the plurality of images.

This image processing method can precisely extract a specific image region even when the specific image region to be extracted includes a region similar to an image which is not to be extracted.

In order to achieve the above objects, according to the present invention, there is provided a storage medium storing a program including:

an image input module of inputting a plurality of images including a main image including a specific image region to be extracted, and a sub image which does not include any specific image region to be extracted;

an edge distribution extraction module of extracting edge distributions of the plurality of images;

a main extraction region estimation module of estimating a main extraction region in the main image on the basis of a difference between the plurality of edge distributions; and a region specifying module of extracting or tracing the specific image region on the basis of the main extraction region and the plurality of images.

This storage medium stores a program that can precisely extract a specific image region from a main image including the specific image region to be extracted and a sub image which does not include any specific image region.

In order to achieve the above objects, according to the present invention, there is provided a storage medium storing a program including:

an image input module of inputting a plurality of images including a main image including a specific image region to be extracted, and a sub image which does not include any specific image region to be extracted;

an edge distribution extraction module of extracting edge distributions of the plurality of images;

a difference edge image extraction module of extracting difference data of the plurality of edge distributions;

an outermost contour line extraction module of obtaining an outermost contour line by tracing an outermost line of the difference data;

a main extraction region estimation module of estimating a main extraction region in the main image on the basis of the outermost contour line; and a region specifying module of extracting or tracing the specific image region on the basis of the main extraction region and the plurality of images.

This storage medium stores a program that can precisely extract a specific image region even when the specific image region to be extracted includes a region similar to an image which is not to be extracted.

According to a preferred aspect of the present invention, the image extraction step comprises:

the partial region extraction step of extracting a portion of the image region to be extracted as a partial region from the input image;

the region growing step of performing region growing by thresholding similarities between the extracted partial region as a seed and its neighboring regions; and the extraction step of extracting a region obtained by the region growing as the image region to be extracted.

Hence, even when a portion of the image region to be extracted has similar features of an image to an identical partial region in the reference image, the image region to be extracted can be stably extracted.

According to a preferred aspect of the present invention, the singular contour extraction step includes the step of extracting, as the singular contour portion, edges in the input image which have different line labels in terms of directions in identical neighboring regions of the input image from those in reference image.

Therefore, only a contour inherent to a subject can be extracted by absorbing differences such as a positional offset, rotational offset, distortion, and the like between the reference image and the background portion of the input image if they are present.

According to a preferred aspect of the present invention, the singular contour extraction step comprises:

the dominant line map extraction step of segmenting the reference image into a plurality of blocks and detecting dominant line direction components in the blocks; and the line direction comparison step of comparing a label assigned to each of edges of the input image and the dominant direction line component in the block to which that edge belongs, and when the label assigned to the edge is different from the dominant direction line component in the block to which that edge belongs, the edge is extracted as the singular contour portion of the input image.

Accordingly, only a contour inherent to a subject can be extracted by absorbing differences such as a positional offset, rotational offset, distortion, and the like between the reference image and the background portion of the input image if they are present.

According to a preferred aspect of the present invention, the image extraction step comprises:

the partial region extraction step of binarizing a portion of the image region to be extracted and extracting the binary data as mask data;

the smoothing step of smoothing the extracted mask data; and the singular contour restoration step of restoring the singular contour portion to mask data after the mask data is smoothed.

Hence, partial shape details inherent to a subject can be stably extracted while removing the influences of noise and shading.

According to a preferred aspect of the present invention, the singular contour extraction step includes the step of detecting a occluding boundary line serving as a boundary between the image region to be extracted, and the remaining region, and determining the detected occluding boundary line as the singular contour portion.

Thus, when edge direction components are hard to detect, for example, when a high-density fine pattern is present on the background or the region to be extracted, or when a plain region without texture crosses a line component having a direction component different from the boundary direction of the plain region, a contour line inherent to a subject can be stably extracted.

According to a preferred aspect of the present invention, the singular contour extraction step comprises:

the dominant line map extraction step of segmenting the reference image into a plurality of blocks and detecting dominant line direction components in the blocks, extracting boundary points located in the vicinity of a boundary between a block without any dominant direction line component, and a block with the dominant direction line component among the blocks of the input image, and extracting edges of the input image located at positions closest to the boundary points in a predetermined local region including the boundary point as a portion of the occluding boundary line.

Consequently, even when a plain region without textures crosses a line component having a direction component different from the boundary direction of the plain region, a contour line inherent to a subject can be stably extracted.

According to a preferred aspect of the present invention, the region growing step includes the step of controlling the region growing so that a region growing direction from the edge approximately agrees with a label in terms of directions of that edge.

Henceforth, contour shape details of the object to be extracted can be prevented from being degraded, and image extraction free from missing portions can be realized.

According to a preferred aspect of the present invention, the image matching step comprises:

the corresponding point extraction step of extracting corresponding points between the reference image and input image;

the first transformation step of geometrically transforming one of the input image and reference image on the basis of the extracted corresponding points; and the second transformation step after the geometric transformation, performing color correction of one of the input image and reference image, so that corresponding pixels in regions including the corresponding points have substantially equal gray levels.

Accordingly, even when the reference image and the background portion of the input image have differences due to different photographing conditions or photographing means, image extraction with high tolerance to such differences can be realized.

According to a preferred aspect of the present invention, the geometric transformation includes global or local processing associated with at least one of a translation, rotation, magnification transformation, and perspective transformation.

Hence, image extraction can be stably attained by absorbing changes in photographing position upon inputting an image due to a shake of a photographing means during photographing, rotation of the sensor plane of the photographing means, different numbers of pixels when a photographing means used for photographing the reference image is different from that for photographing the input image, magnification differences in photographing, optical characteristics differences such as aberrations, and the like.

According to a preferred aspect of the present invention, the outermost contour line extraction means comprises:

defect detection means for detecting gaps of the difference data; and linking means for linking the gaps.

Therefore, even when an image which is similar to the specific image to be extracted but is not to be extracted is present in the vicinity of the specific image region to be extracted, the specific image region can be precisely extracted.

According to a preferred aspect of the present invention, the outermost contour line extraction means extracts a plurality of outermost contour lines located at uppermost, lowermost, rightmost, and leftmost sides of the difference data, and said main extraction region estimation means estimates the main extraction region on the basis of a logic operation result of a plurality of binarized outer regions obtained associated with the outermost contour lines.

As a consequence, even when an image which is similar to the specific image to be extracted but is not to be extracted is present in the vicinity of the specific image region to be extracted, the specific image region can be precisely extracted.

According to a preferred aspect of the present invention, the region specifying means extracts or tracks the specific image region on the basis of an initial region obtained by performing thresholding difference data between the main and sub images, and the main extraction region.

Hence, even when the specific image region to be extracted includes many regions similar to an image which is not to be extracted, the specific image region can be precisely extracted.

According to a preferred aspect of the present invention, the region specifying means grows the initial region as a seed in the main extraction region on the basis of thresholding results of similarities with neighboring regions of the initial region.

Thus, even when an image which is similar to the specific image to be extracted but is not to be extracted is present in the vicinity of the specific image region to be extracted, the specific image region can be precisely extracted.

According to a preferred aspect of the present invention, the region specifying means comprises:

hole determination means for determining a hole region of the specific image region on the basis of difference data between the main and sub images; and non-hole region extraction means for extracting a region except for the hole region from the initial region.

Hence, even when the specific image region to be extracted includes a hole region, the specific image region can be precisely extracted.

According to a preferred aspect of the present invention, the image processing apparatus comprises information input means for inputting rough information of a shape of the specific image region to be extracted.

Therefore, by inputting a rough shape of the specific image region to be extracted in advance, the specific image region can be precisely extracted at high speed.

According to a preferred aspect of the present invention, the main and sub images are a plurality of images photographed at different times.

According to a preferred aspect of the present invention, the main image is a moving image, and the sub image is a still image.

According to a preferred aspect of the present invention, the outermost contour line extraction step comprises:

the gap detection step of detecting gaps of the difference data; and the linking step of linking the gaps.

Accordingly, even when an image which is similar to the specific image to be extracted but is not to be extracted is present in the vicinity of the specific image region to be extracted, the specific image region can be precisely extracted.

According to a preferred aspect of the present invention, the outermost contour line extraction step includes the step of extracting a plurality of outermost contour lines located at uppermost, lowermost, rightmost, and leftmost sides of the difference data, and the main extraction region estimation step includes the step of estimating the main extraction region on the basis of a logic operation result of a plurality of outer regions obtained associated with the outermost contour lines.

Thus, even when an image which is similar to the specific image to be extracted but is not to be extracted is present in the vicinity of the specific image region to be extracted, the specific image region can be precisely extracted.

According to a preferred aspect of the present invention, the specific image region is extracted or tracked in the region specifying step on the basis of an initial region obtained by performing thresholding of difference data between the main and sub images, and the main extraction region.

Consequently, even when the specific image region to be extracted includes many regions similar to an image which is not to be extracted, the specific image region can be precisely extracted.

According to a preferred aspect of the present invention, the specific image region is grown using the initial region as a seed in the main extraction region in the region specifying step on the basis of thresholding results of similarities with neighboring regions of the initial region.

Henceforth, even when an image which is similar to the specific image to be extracted but is not to be extracted is present in the vicinity of the specific image region to be extracted, the specific image region can be precisely extracted.

According to a preferred aspect of the present invention, the region specifying step comprises:

the hole determination step of determining a hole region of the specific image region on the basis of difference data between the main and sub images; and the non-hole region extraction step of extracting a region except for the hole region from the initial region.

Thus, even when the specific image region to be extracted includes a hole region, the specific image region can be precisely extracted.

According to a preferred aspect of the present invention, the image processing method comprises the information input step of inputting rough information of a shape of the specific image region to be extracted.

Accordingly, by inputting a rough shape of the specific image region to be extracted in advance, the specific image region can be precisely extracted at high speed.

According to a preferred aspect of the present invention, the outermost contour line extraction module stores a program including a gap detection module of detecting gaps of the difference data, and a linking module of linking the gaps.

Hence, even when an image which is similar to the specific image to be extracted but is not to be extracted is present in the vicinity of the specific image region to be extracted, the specific image region can be precisely extracted.

According to a preferred aspect of the present invention, the medium stores a program of extracting a plurality of outermost contour lines located at uppermost, lowermost, rightmost, and leftmost sides of the difference data in the outermost contour line extraction module, and a program of estimating the main extraction region on the basis of a logic operation result of a plurality of outer regions obtained associated with the outermost contour lines in the main extraction region estimation module.

As a result, even when an image which is similar to the specific image to be extracted but is not to be extracted is present in the vicinity of the specific image region to be extracted, the specific image region can be precisely extracted.

According to a preferred aspect of the present invention, the medium stores a program of extracting or tracing the specific image region in the region specifying module on the basis of an initial region obtained by performing thresholding difference data between the main and sub images, and the main extraction region.

Henceforth, even when the specific image region to be extracted includes many regions similar to an image which is not to be extracted, the specific image region can be precisely extracted.

According to a preferred aspect of the present invention, the medium stores a program of growing the specific image region using the initial region as a seed in the main extraction region in the region specifying module on the basis of thresholding results of similarities with neighboring regions of the initial region.

Hence, even when an image which is similar to the specific image to be extracted but is not to be extracted is present in the vicinity of the specific image region to be extracted, the specific image region can be precisely extracted.

According to a preferred aspect of the present invention, the region specifying module stores a program including a hole determination module of determining a hole region of the specific image region on the basis of difference data between the main and sub images, and a non-hole region extraction module of extracting a region except for the hole region from the initial region.

Thus, even when the specific image region to be extracted includes a hole region, the specific image region can be precisely extracted.

According to a preferred aspect of the present invention, the medium stores a program including an information input module of inputting rough information of a shape of the specific image region to be extracted.

Therefore, by inputting a rough shape of the specific image region to be extracted in advance, the specific image region can be precisely extracted at high speed.

According to a preferred aspect of the present invention, the medium stores a program for inputting a moving image as the main image and a still image as the sub image.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

The preferred embodiments of the present invention will now be described with reference to the accompanying drawings.

FIRST EMBODIMENT

Figure 1:
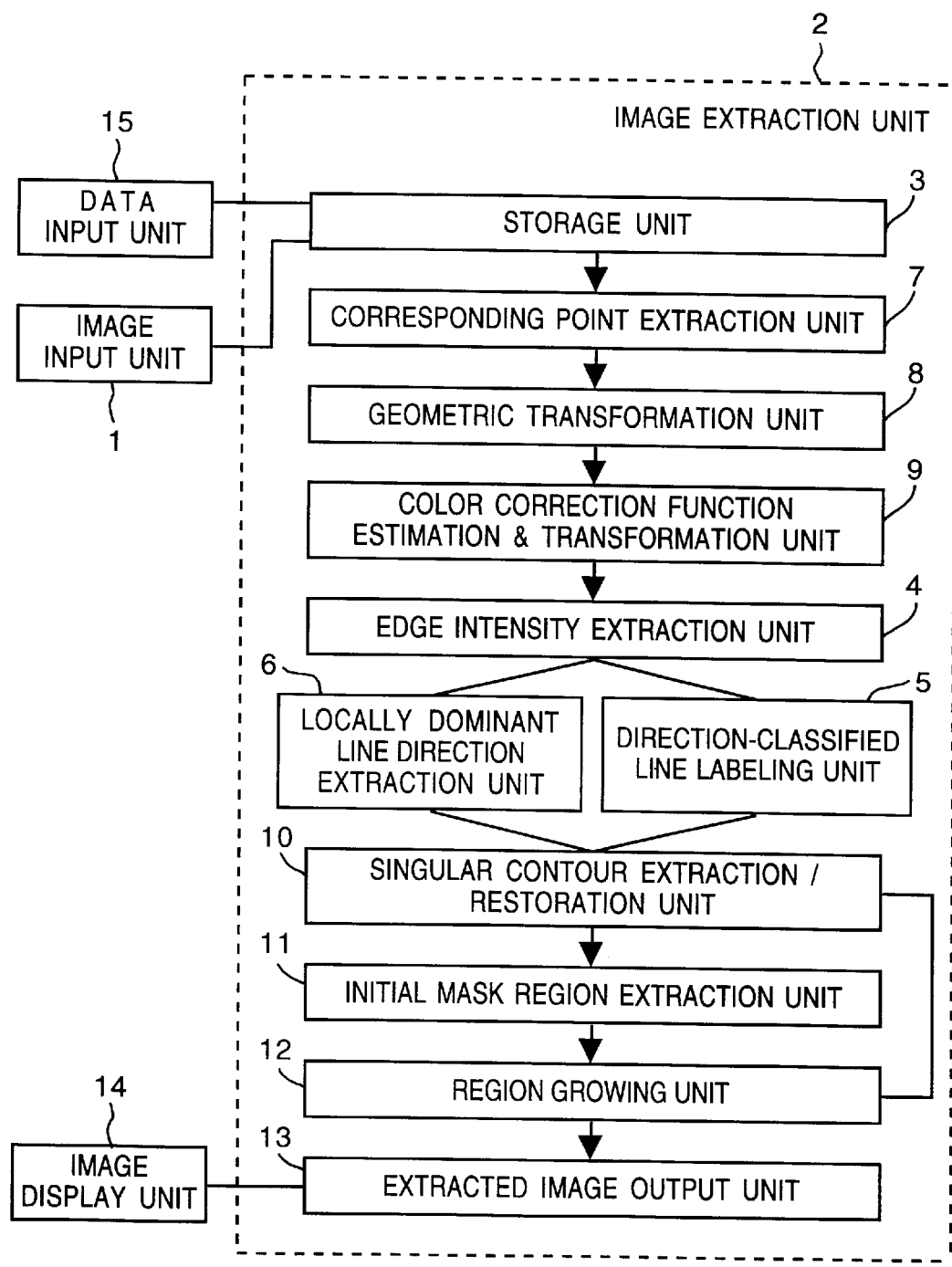
FIG. 1 is a block diagram showing the arrangement of an image segmentation unit that builds an embodiment of an image division apparatus according to the present invention.

FIG. 1 is a block diagram showing the arrangement of an image extraction unit 2 that builds an embodiment of an image division apparatus according to the present invention.

This embodiment extracts a subject to be extracted from an input image using an input image including the subject, and a background image except for the subject. The input image and background image are input from an image input unit 1 to the image extraction unit 2, as shown in FIG. 1. The image input unit 1 comprises, e.g., an image sensing device mainly having an optical imaging system including a lens, stop, and driving control unit for them, an image sensor, a video signal processing circuit unit, an image recording unit, and the like.

As shown in FIG. 1, the image extraction unit 2 has a storage unit 3 which stores the input image and background image input from the image input unit 1, and data input by a data input unit 15 such as a mouse, keyboard, or the like, and a corresponding point extraction unit 7 for searching for corresponding points between the input image and background image and generating corresponding points' position data.

The generated corresponding points' position data are supplied to a geometric transformation unit 8, which geometrically transforms one of the background image and input image on the basis of the input corresponding point positions' data. The two images, one of which are geometrically transformed, are supplied to a color correction estimation and transformation unit (to be referred to as a color correction unit hereinafter) 9, which estimates a color correction function for making brightness levels of the respective pixels in regions including the corresponding points roughly equal each other on the basis of pixel value data (e.g., R, G, and B values or the like) of the corresponding points, and performs color correction of one of the two input images using the estimated color correction function.

After the geometric transformation and gradation transformation, the two images are supplied to an edge intensity extraction unit 4, which extracts the edge distributions in the two images. The extracted edge distributions of the two images are supplied to a direction-classified line labeling unit 5 and a locally dominant line direction extraction unit 6. The direction-classified line labeling unit 5 performs direction-classified line detection and labeling for the individual edges on the basis of the extracted edge distribution of the two images. The locally dominant line direction extraction unit 6 divides the two images into a plurality of blocks having a proper size, and performs locally dominant line direction detection and labeling on the basis of the edge distributions.

Data obtained by labeling are supplied to a singular contour extraction/restoration unit 10, which extracts the corresponding edges in the input images, which have different direction-classified line labels in identical neighboring regions in the input image and background image, as the contour line of a subject, i.e., a singular contour. After the unit 10 smoothes the singular contour, it restores the smoothed contour as a portion of initial seeds.

The extracted singular contour is supplied to an initial mask region extraction unit 11, which extracts a portion of the singular contour as an initial seed by thresholding. The extracted initial seed is supplied to a region growing unit 12, which performs region growing by thresholding of similarity between the initial seed and its neighboring region.

The data obtained by the region growing is supplied to an extracted image output unit 13, which uses a region indicated by the grown region data as an object extraction mask, and extracts a region corresponding to the object extraction mask region from the input image. Image data in the extracted region is supplied to an image display unit 14, which displays an image (subject) represented by the image data in the extracted region.

Figure 2:
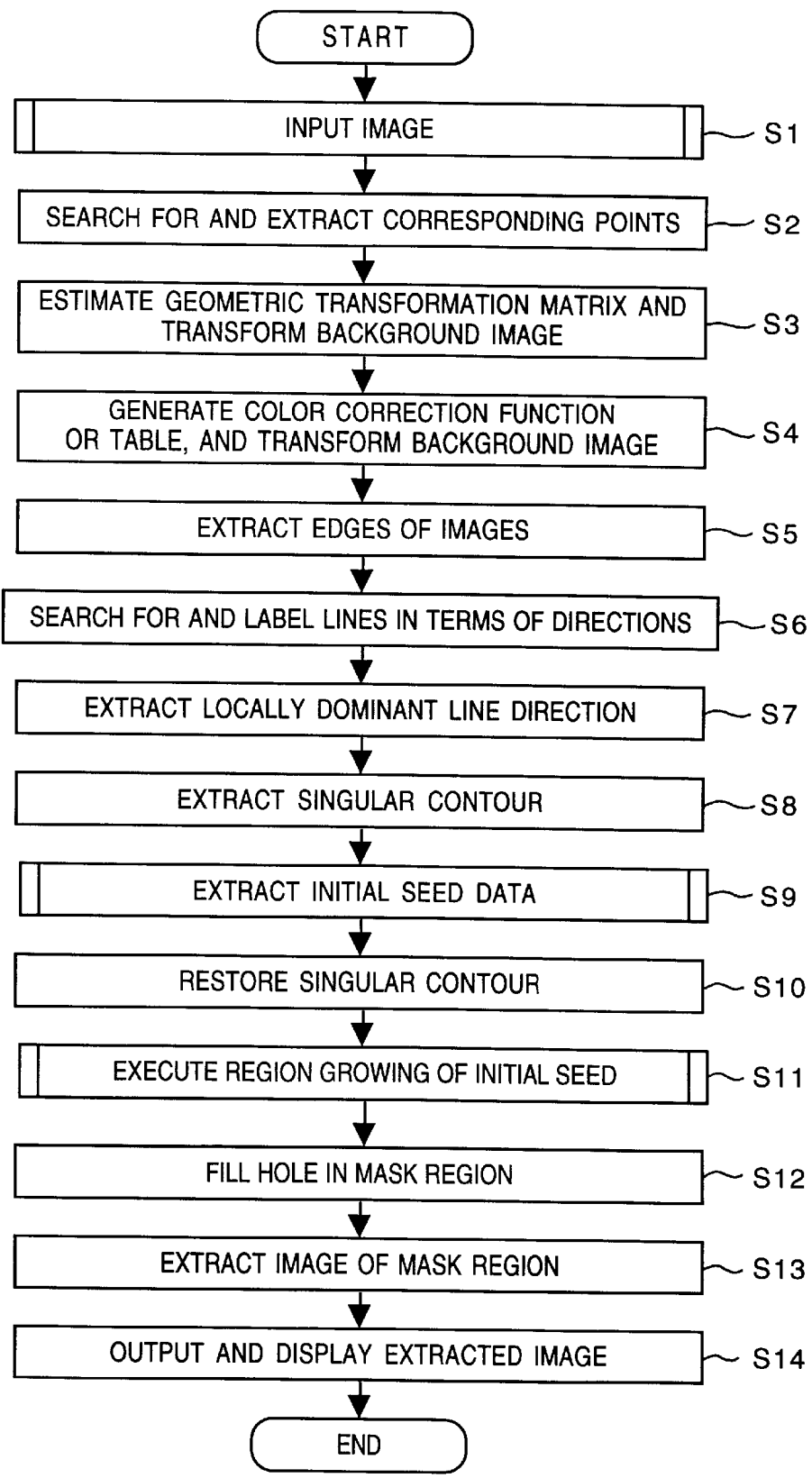
FIG. 2 is a flow chart showing the image extraction processing by the image extraction unit shown in FIG. 1.
Figure 3:
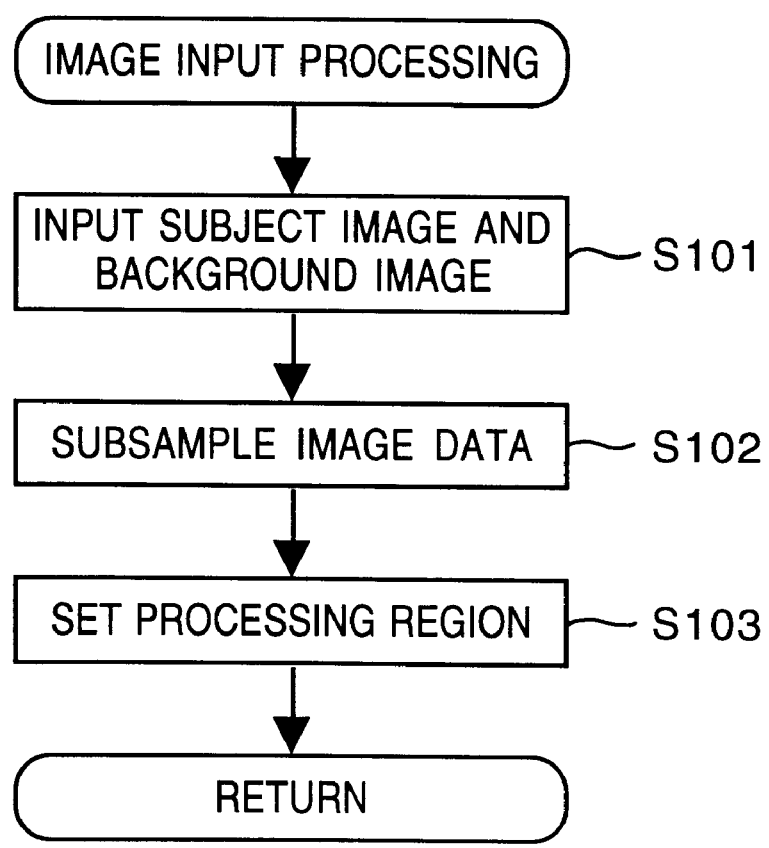
FIG. 3 is a flow chart showing the image input processing in the image extraction processing shown in FIG. 2.
Figure 4:
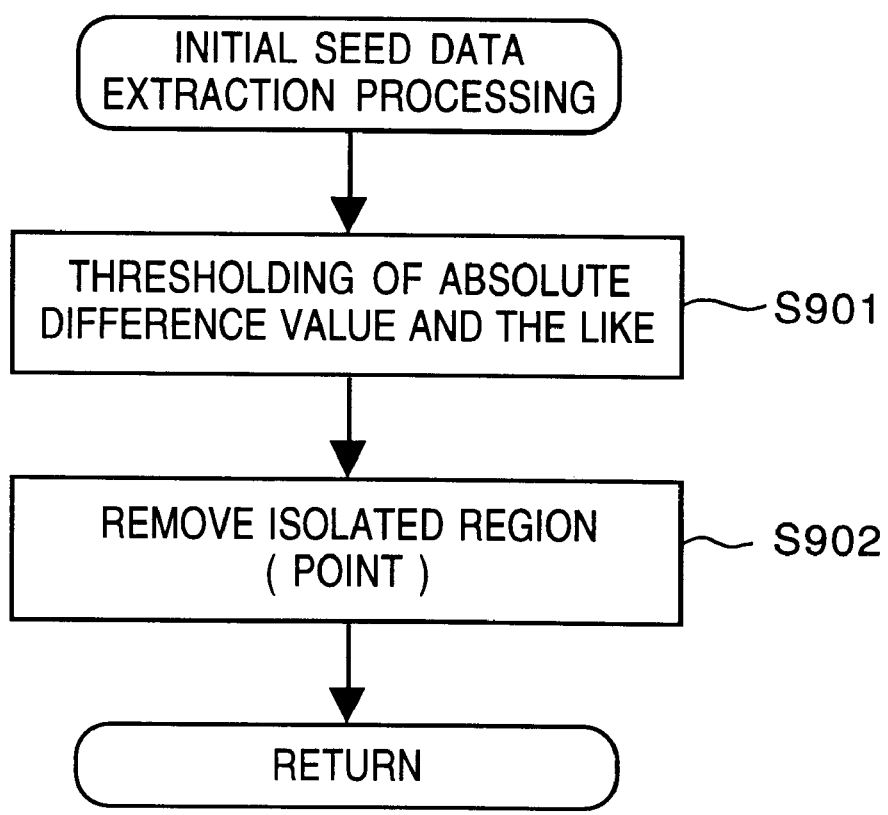
FIG. 4 is a flow chart showing the initial seed data processing in the image extraction processing shown in FIG. 2.
Figure 5:
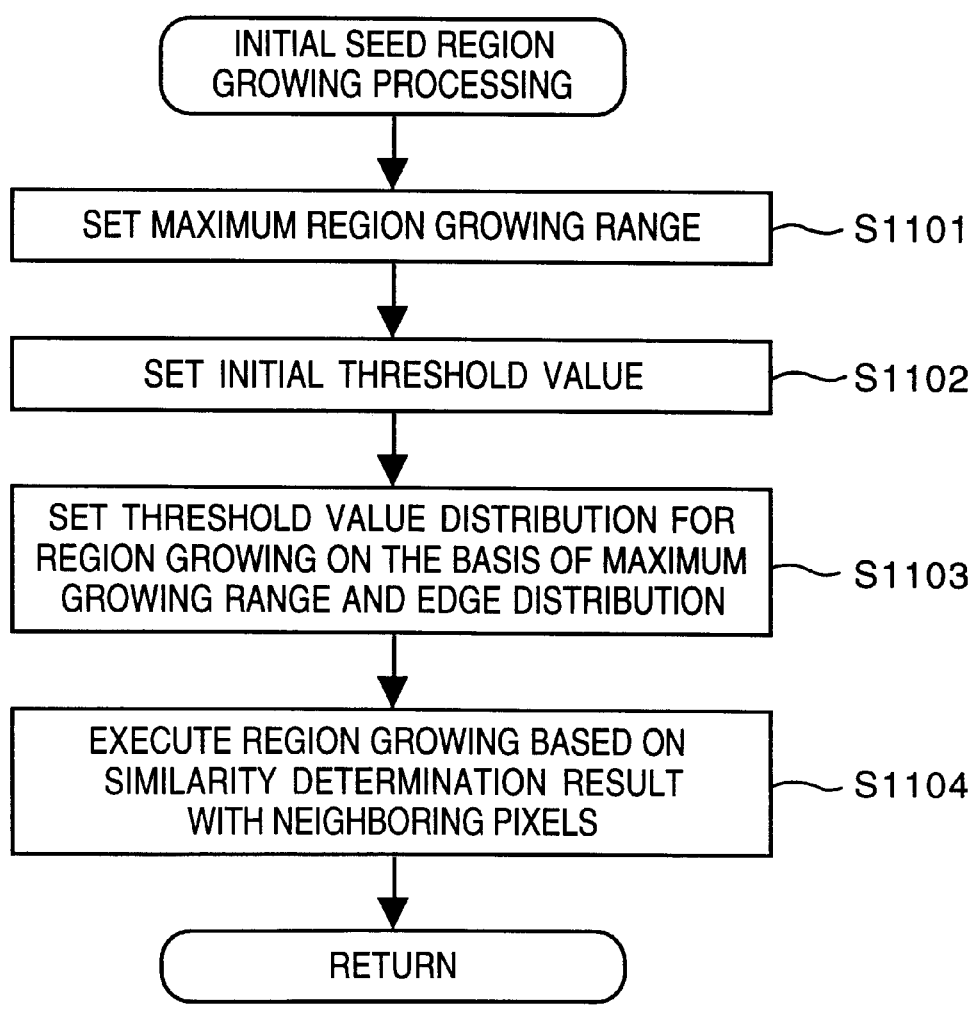
FIG. 5 is a flow chart showing the initial region growing processing in the image extraction processing shown in FIG. 2.

The image extraction processing in this embodiment will be described below with reference to FIGS. 2 to 5. FIG. 2 is a flow chart showing the image extraction processing by the image extraction unit 2 shown in FIG. 1, FIG. 3 is a flow chart showing the image input processing in the image extraction processing shown in FIG. 2, FIG. 4 is a flow chart showing the initial seed data processing in the image extraction processing shown in FIG. 2, and FIG. 5 is a flow chart showing the initial region growing processing in the image extraction processing shown in FIG. 2.

Referring to FIG. 2, image input processing is done in step S1. In this image input processing, as shown in FIG. 3, an input image including an object (subject) to be extracted and a background image including no object are input from the image input unit 1 (FIG. 1), and are stored in the storage unit 3 (FIG. 1), in step S101. Image data input at a proper reduced scale are subsampled in step S102, and a region including the subject is specified on the input image as a processing region using the mouse or the like of the data input unit 15 in step S103.

After the subsampling and region specification, the images are stored in the storage unit 3 again, and the stored images are used in the subsequent processing.

Figure 9A:
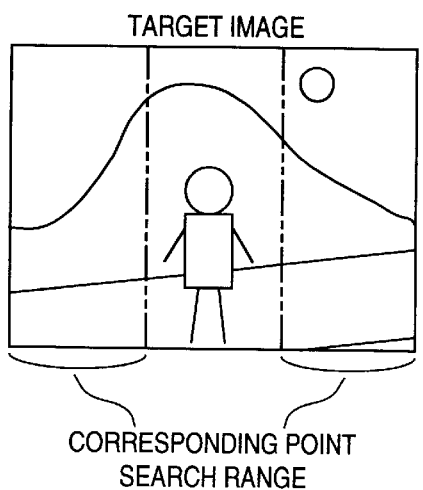
FIG. 9A shows an example of an input image on which the corresponding point search range is to be set in the second embodiment of the present invention.
Figure 9B:
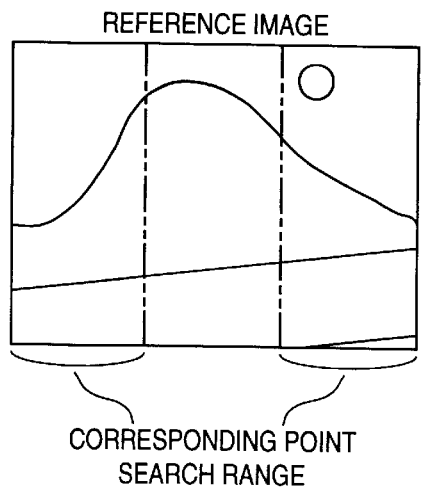
FIG. 9B shows an example of a background image on which the corresponding point search range is to be set in the second embodiment of the present invention.

The flow then advances to step S2, and the corresponding point extraction unit 7 searches for and extracts corresponding points between the two images within 25% to 35% region ranges of the image frame width from the right and left ends of each image or regions outside the processing region if it is set in step S103 above. FIGS. 9A and 9B show setting examples of the corresponding point search ranges.

Assuming that the input image (target image) is an image shown in FIG. 9A and the background image (reference image) is an image shown in FIG. 9B, predetermined region ranges from the right and left ends of each image (the ranges from the right and left edges to the positions indicated by the two-dashed chain lines) are set as the corresponding point search ranges, and are normally fixed even when each corresponding point search range includes a portion of the subject in the input image. In some cases, when the corresponding point search range includes a portion of the subject, corresponding point extraction errors may occur. However, since erroneously extracted corresponding points are excluded by selection process of corresponding points (to be described later), and a problem (geometric transformation errors) resulting from corresponding point extraction errors can be prevented.

The corresponding point extraction is done for the purpose of absorbing any conditional differences such as variations of the view point position, offsets such as the positional offset, rotation, and the like of an image caused by, e.g., a camera shake, variations of the magnification, and the like with respect to geometric transformation (to be described later) for one of the background image and input image. As the corresponding point extraction method, block matching that obtains points which yield a maximum correlation between blocks which have individual points of one image as the center and a predetermined size, and blocks having a predetermined size of the other image. Alternatively, other methods may be used. After the corresponding points are extracted, corresponding point position data indicating the positions of the extracted corresponding points are generated.

The flow then advances to step S3, and the geometric transformation unit 8 estimates a transformation matrix and geometrically transforms one of the two images using the corresponding point position data, so that the corresponding pixel positions between the two images match each other, i.e., are set at identical positions in the image frame. In this embodiment, the background image is geometrically transformed. The geometric transformation includes translation, rotation, enlargement/reduction having a given point as the center, or transformation as a combination of them. In this processing, transformation from one point to the other corresponding point may be done using the transformation matrix estimated for the corresponding points, pairs of corresponding points, each of which yields position errors between the transformed point and the estimated corresponding point greater than a predetermined threshold value, may be excluded, and the transformation matrix may be estimated again using the remaining pairs of corresponding points. Also, such selection of the corresponding points may be repeated until the average value of the above-mentioned errors becomes equal to or smaller than a predetermined threshold value.

Subsequently, in step S4, the color correction unit 9 generates a transformation function or table for color correction that can make the pixel levels of the corresponding points match each other, and transforms (corrects) the gradation characteristics of one of the two images in accordance with the transformation function or table.

In this embodiment, color correction is done for the background image. More specifically, for R, G, and B pixel values, the color correction or look-up table (a function or table that represents R, G, and B levels, i.e., transformation values corresponding to levels ranging from 0 to 255) of the corresponding points between the background image and input image is estimated by recursive analysis using least squares method or the like. By executing color correction according to the transformation function or table, variations of the exposure condition, white balance characteristics, and the like can be absorbed between the input image and background image, thus stably improving the precision of image extraction (to be described later).

After color correction of one image, the flow advances to step S5, and the edge intensity extraction unit 4 executes edge extraction processing. Subsequently, in step S6, the direction-classified line labeling unit 5 executes direction-classified line detection and labeling. The edge extraction processing uses differential operators such as SOBEL operators and the like. The direction-classified line detection and labeling are done based on the following matrices in the order of, e.g., the horizontal direction, vertical direction, 45° oblique direction, and −45° oblique direction:

$$\begin{bmatrix} -1 & -1 & -1 \\ 2 & 2 & -1 \\ -1 & -1 & -1 \end{bmatrix}, \begin{bmatrix} -1 & 2 & -1 \\ -1 & 2 & -1 \\ -1 & 2 & -1 \end{bmatrix}, \begin{bmatrix} -1 & -1 & 2 \\ -1 & 2 & -1 \\ 2 & -1 & -1 \end{bmatrix}, \begin{bmatrix} 2 & -1 & -1 \\ -1 & 2 & -1 \\ -1 & -1 & 2 \end{bmatrix}$$

A method of performing convolution calculations between these matrices and the images and performing labeling in units of pixels depending on the calculated values is used. More specifically, a direction which yields a maximum convolution value between direction detection operator (matrix) and edge data and larger than a predetermined threshold value, is specified and labeled to the edge. When the convolution values of all the directions are equal to or smaller than the threshold value, no label is assigned. Alternatively, using an appropriate threshold value, pixels whose convolution values are equal to or larger than the threshold value may be assigned a plurality of line labels. The direction-classified line detection is not limited to the above-mentioned method. For example, in order to attain direction detection more precisely, the size of the detection matrix may be set at 5×5 or larger to detect +/−30° directions and +/−60° directions in addition to the above-mentioned four directions.

The flow then advances to step S7. In step S7, the locally dominant line direction extraction unit 6 divides each image into a plurality of blocks having a proper size (e.g., a 5×5 image size), obtains the total numbers of direction-classified labeled edges in each block, and determines a direction with a label corresponding to the largest total number as a locally dominant line direction in that block. Then, the unit 6 sets the representative line direction label value of that block on the basis of the determined direction, and assigns an identical label to the individual pixel positions in the block.

Figure 11A:
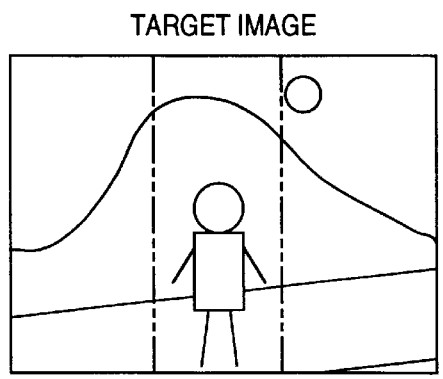
FIG. 11A shows an example of an input image to explain the locally dominant line direction label extraction process.
Figure 11B:
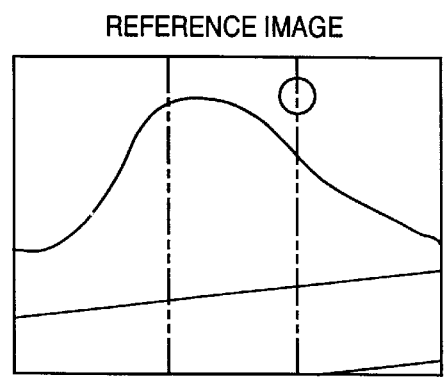
FIG. 11B shows an example of a background image to explain the locally dominant line direction label extraction process.
Figure 11C:
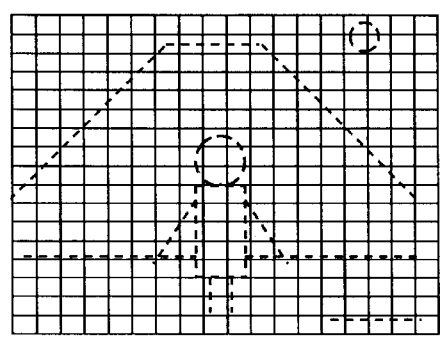
FIG. 11C shows an example of an image divided into a plurality of blocks having a predetermined size in the locally dominant line direction label extraction process for the input image shown in FIG. 11A.
Figure 11D:
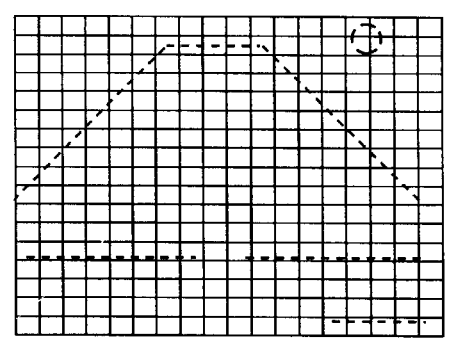
FIG. 11D shows an example of an image divided into a plurality of blocks having a predetermined size in the locally dominant line direction label extraction process for the background image shown in FIG. 11B.
Figure 11E:
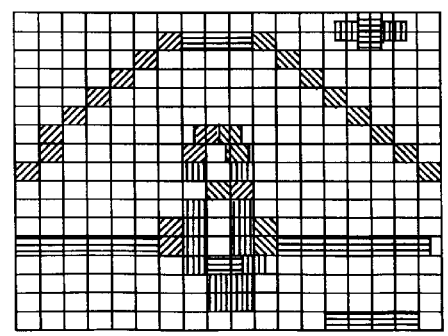
FIG. 11E shows an example of an image obtained by assigning a horizontal direction label, vertical direction label, 45° direction label, or −45° direction label to the input image shown in FIG. 11A.
Figure 11F:
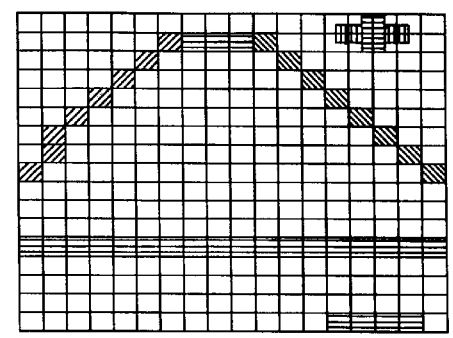
FIG. 11F shows an example of an image obtained by assigning a horizontal direction label, vertical direction label, 45° direction label, or −45° direction label to the background image shown in FIG. 11B.

FIGS. 11A to 11F show an example of the locally dominant line direction extraction process. For example, assuming that the image shown in FIG. 11A is the input image (target image) and the image shown in FIG. 11B is the background image (reference image), the background image geometrically transformed in step S3 is given in step S7, and the background image and input image are divided into a plurality of blocks having a predetermined size, as shown in FIGS. 11C and 11D. The line directions of the individual blocks of each image are detected, and direction-classified labels are assigned to the corresponding blocks. As a result of labeling, the corresponding blocks of the input image and background image are assigned horizontal, vertical, 45°, or −45° direction labels, as shown in FIGS. 11E and 11F.

After the labeling processing, the flow advances to step S8, and the singular contour extraction/restoration unit 10 executes singular contour extraction processing. Basically, lines having direction labels different from those on the edges on the background image are extracted as a contour line inherent to the subject, i.e., singular contours. However, owing to alignment errors, i.e., geometric transformation errors between the background image and input image, or owing to focusing variations and exposure (illumination) condition variations even if no geometric transformation errors are produced, a line in a portion of target image is not always present at an identical position in the identical background portion.

In order to solve such problem, using the locally dominant line labels of the background image, the label and the line direction label in the input image are compared with each other at each pixel position. If the label matches the line direction label in the input image, that line is estimated as a portion of the edge of the background image region; otherwise, that line is extracted as a portion of a contour (singular contour) inherent to the subject.

In this embodiment, the direction-classified line labels of the input image and the locally dominant direction-classified labels are used. Alternatively, singular contour extraction may be done using the other combination of labels or all the labels.

As another method, local neighboring regions (e.g., 5×5 image size) are set on the background image with each center, at point on the edges of the input image, and an edge is searched for in each region. If an edge with the same label is found, it is determined that the edge is that of the background region. If the edge has a different label, it is extracted as a singular contour.

Furthermore, FIGS. 12A to 12F show another exemplary process of singular contour extraction. When the pattern of the background is occluded by a subject without texture (object to be extracted) and the color or pixel value of the subject is not so different from that of the background portion, i.e., when a low-contrast portion is present, a contour line unique to a desired subject cannot often be easily extracted even if labeling is done by the above-mentioned method.

Figure 12A:
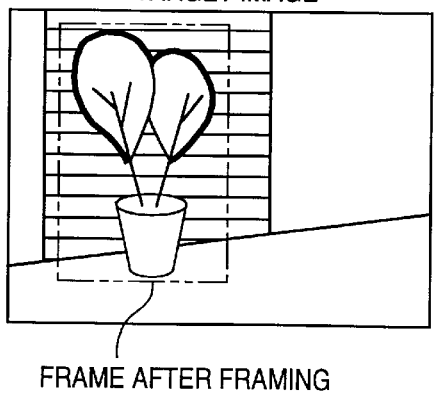
FIG. 12A shows an example of an input image in the occluding contour line extraction process.
Figure 12B:
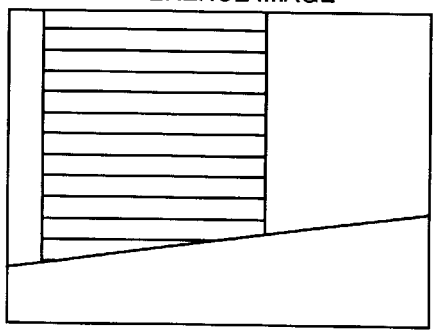
FIG. 12B shows an example of a background image in the occluding contour line extraction process.
Figure 12C:
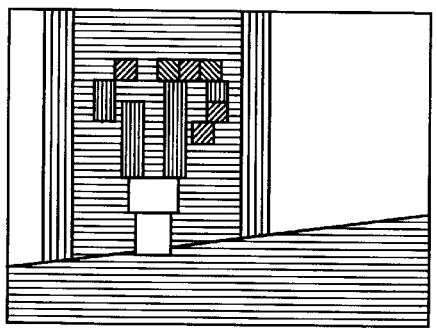
FIG. 12C shows an example of an image obtained by segmenting the input image shown in FIG. 12A into a plurality of blocks having a predetermined size, and assigning locally dominant line direction labels to the individual blocks.
Figure 12D:
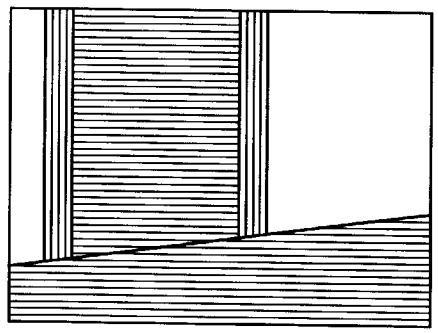
FIG. 12D shows an example of an image obtained by segmenting the background image shown in FIG. 12B into a plurality of blocks having a predetermined size, and attaching locally dominant line direction labels to the individual blocks.

More specifically, assuming that the image shown in FIG. 12A is the input image (target image) (a frame after framing is indicated by a two-dashed chain line), the image shown in FIG. 12B is the background image (reference image), and the contour line of a flowerpot of the subject in the input image has a low-contrast portion (indicated by a dotted line), that low-contrast portion of the contour line cannot often be extracted. In view of this problem, as shown in FIGS. 12C and 12D, the two images are divided into a plurality of blocks having a predetermined size, and locally dominant line direction labels are assigned to the individual blocks (the label directions include the horizontal, vertical, 45°, and −45° directions).

Figure 12E:
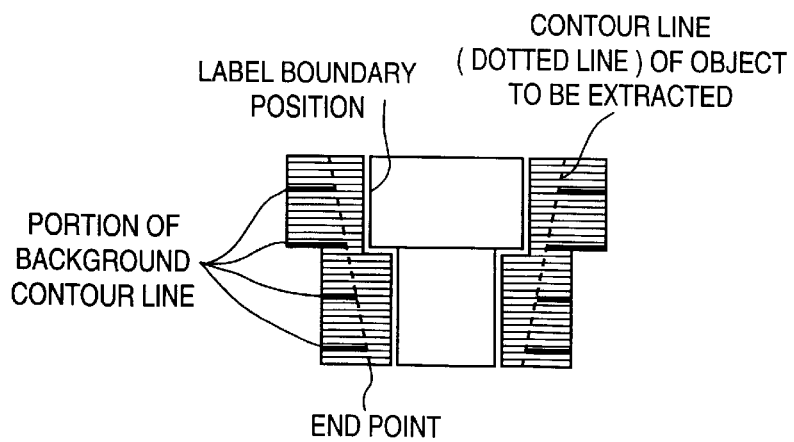
FIG. 12E shows an image obtained by locally searching for and extracting the end point position of the contour line of a background or subject form points on the boundary (or closest to the boundary) between non-labeled and labeled blocks.

Finally, the end point positions of the contour line of the background or subject are locally searched for and extracted from the points on the boundary (or a portion closest thereto) between non-labeled and labeled blocks shown in the enlarged view of FIG. 12E.

In this case, since the contour line portion of the background has high contrast and appears clearly, it can be detected easily. By connecting the end point positions, a boundary line between the subject and background, i.e., the occluding contour line can be extracted as the contour line (singular contour) of the subject.

As described above, with the processing from step S2 to step S8, a contour inherent to the subject can be precisely extracted to have high tolerance even when the photographing conditions vary, especially, the view point position, focusing, magnification, and the like vary (except for a case wherein both the position and direction of the contour of the subject match those of the contour of the background).

The flow then advances to step S9, and the initial mask region extraction unit 11 performs initial seed data extraction processing. In this processing, as shown in FIG. 4, the differences in color components (R, G, and B values, hues, or saturations) of pixels between the background image and input image are calculated in step S901. For example, the absolute difference values of the individual components are calculated based on the calculated differences, and are subjected to thresholding to extract an initial seed. When a relatively high threshold value is set, the influences of variations of pixel values caused by noise and different photographing conditions can be removed, and a light shadow or the like can also be removed. As data (initial seed data) representing the initial seed, we use binary data having "0" as a subject region and "1" as a background region.

When the difference data are simply subjected to thresholding, minute noise components often remain unremoved. For the purpose of removing such noise, an isolated region (point) is removed in step S902. More specifically, an isolated point or an isolated region with a small area of the background portion is removed. In place of removing the isolated region (point), smoothing processing for removing noise components from initial seed data using a smoothing filter such as a median filter having an appropriate size may be used.

It is normally difficult to select the background portion alone and to automatically remove it. As a result, a partial region of the subject, especially, partial shape details of the subject are often removed. To solve this problem, the flow advances to step S10. The singular contour extraction/restoration unit 10 restores the singular contour extracted in step S8 as a portion of the initial seed after the isolated region (point) is removed.

Figure 8A:
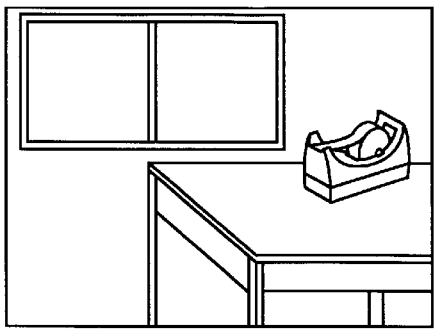
FIG. 8A shows an example of an input subject image according to the first embodiment of the present invention.
Figure 8B:
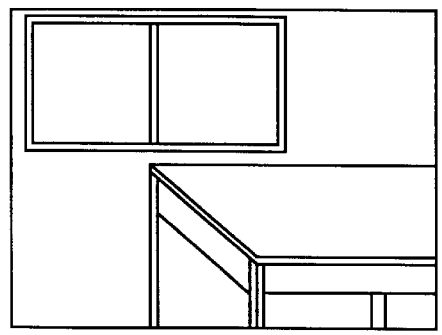
FIG. 8B shows an example of an input background image according to the first embodiment of the present invention.
Figure 8C:
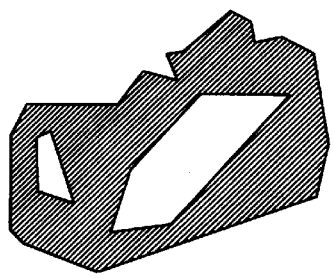
FIG. 8C shows an example of an image after initial seed extraction according to the first embodiment of the present invention.

FIGS. 8A to 8F show an example of the initial seed data extraction processing. In this example, assuming that the image shown in FIG. 8A is the input image (target image) and the image shown in FIG. 8B is the background image (reference image), a mask region is obtained by the initial seed data extraction processing shown in FIG. 8C. A region painted in black in this mask region represents the subject region.

As can be seen from FIGS. 8A to 8F, in a general combination of a background and subject, it is impossible to perfectly extract the region of the subject to be extracted. More specifically, when a partial region in which the R, G, and B levels or their local statistical values (average values, standard deviations, or the like) are similar to each other is present at identical positions in the input image and background image, the local region remains as an unextracted region after the thresholding. In order to extract this unextracted region, the region growing unit 12 performs growing processing of the initial seed in step S11.

In the initial seed growing processing, the similarities of pixel features with neighboring pixels (or regions) at points on boundaries of seed regions of the initial mask are calculated. When the similarity is higher than a predetermined threshold value, the corresponding neighboring pixel is determined as the one to be included in the subject region, and is incorporated in the mask region. As shown in FIG. 5, prior to region growing, in this embodiment, a maximum region of the growing range of the initial seed is set in step S1101. The maximum region is set to limit the growing range, and is processed on the basis of data representing the mask region.

The flow then advances to step S1102, and initial threshold values for luminance level and hue differences from those of neighboring pixels are set as feature parameters required for determining similarities. These initial threshold values may be automatically set on the basis of statistical values such as average values, standard deviations, or the like of difference (or absolute difference value) data associated with their parameters between the background image and input image.

Subsequently, in step S1103, each threshold value is variably set on the basis of the maximum region growing range and the edge intensity distribution. A high threshold value is set within the maximum region growing range, and a low threshold value is set outside the range.

More specifically, when a point (X, Y) falls within the maximum region growing range, a high threshold value, e.g., the initial threshold value, is set; when the point falls outside the range, a low threshold value, e.g., a value 10% of the initial threshold value, is set. Alternatively, a threshold value outside the maximum region growing range may be set by a distribution function. The distribution function of the threshold value can be obtained by approximation using an arbitrary function, which decreases the threshold value as the distance from the boundary line of the maximum region growing range becomes larger. As another method of setting a threshold value, threshold values are set within the maximum region growing range in units of growing directions, and a value higher than a threshold value in a direction different from the locally dominant line direction of the input image is set for the locally dominant line direction.

In this embodiment, the edge intensity distribution of the input image is binarized using a predetermined threshold value, and a low threshold value is set at the positions of edges and their neighboring positions. Especially, the types of edges may be limited, and a low threshold value may be set at the positions of edges on the singular contour line and their neighboring positions. The threshold value distribution used assumes the lowest value at the edge position (if "0" is set, the growing of a region that crosses the edge is perfectly suppressed), and assumes a value that increases slightly as the distance from the edge increases or assumes a uniformly low value at the edge position and its neighboring position.

Note that the boundary line of the maximum region growing range may be superimposed on the input image displayed on the image display unit 14, and the user may select an appropriate smoothing filter size on the basis of the displayed range.

With the above-mentioned threshold value setting, even when the threshold value is slightly roughly set, a stable region growing result that follows the contour shape of the subject and suffers less shape variations can be obtained.

Even when the boundary line of the maximum region growing range is different from the outer contour shape of the subject, the contour line obtained as a result of region growing and that of an actual subject can be finally matched.

The flow then advances to step S1104 to determine the similarities of neighboring pixels, and region growing is done based on the similarity determination result. In this embodiment, whether or not all the R, G, and B difference absolute values from a certain neighboring pixel become equal to or smaller than a threshold value or whether or not the absolute hue difference value from the neighboring pixel becomes equal to or smaller than a threshold value is used as a similarity determination condition, i.e., a growing condition, and when one of these conditions is satisfied, the neighboring pixel is merged in an identical subject region.

The characterizing factors used in similarity determination are not limited to the above-mentioned R, G, and B values or hue value. For example, low-level features such as saturation, high-level features such as the partial shape (the direction of segment or the like) of a local line segment including an edge, or features (variance, moment, and the like) obtained by statistically processing low-level features such as the local spatial frequency, R, G, and B values, and the like may be used. Also, the merging processing of the region growing need not always be done in units of pixels, but may be done between regions obtained by other methods.

Figure 8D:
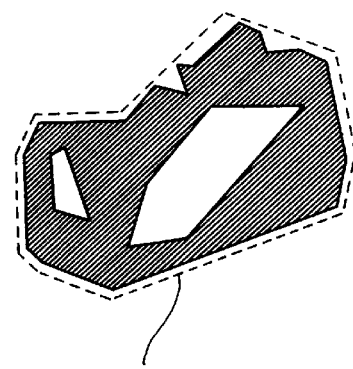
FIG. 8D shows an example of an image set with a maximum region growing range according to the first embodiment of the present invention, the dotted line indicating the maximum region growing range.

FIG. 8D shows an example of the region growing result. As can be seen from a comparison between FIGS. 8D and 8A, the contour line obtained as a result of the region growing nearly matches that of the actual subject.

After the region growing, the flow advances to step S12 (FIG. 2) to execute hole filling processing for automatically filling holes having a predetermined size or less in the mask region. This hole filling processing is done independently of the similarities, uniformities, or the like of the image features to neighboring regions. That is, this processing is done independently of the input image data, and is performed for binary mask data representing the region after region growing.

Figure 8E:
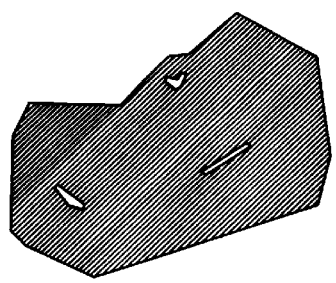
FIG. 8E shows an example of an image after region growing (before hole filling) according to the first embodiment of the present invention.

Next, in step S13, the mask region after the region growing subjected to the hole filling processing is used as a subject extraction mask region, and the corresponding region, i.e., the subject region, is extracted from the input image. In this processing, the subject region may be extracted after the smoothing processing of the boundary line of the subject mask region or the correction processing of the boundary line. FIG. 8E shows the result of the hole filling processing.

Figure 8F:
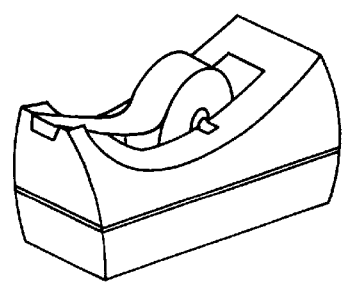
FIG. 8F shows an example of an extracted image obtained by the respective processing operations according to the first embodiment of the present invention.

In step S14, image data (or image file) in the extracted region is output to the image display unit 14, and a subject as the extracted image is displayed. As a result of this extraction processing, the subject shown in FIG. 8F is extracted from, e.g., the input image shown in FIG. 8A, and the extracted image is displayed. After the subject is extracted from the input image and is displayed, this processing ends.

SECOND EMBODIMENT

Figure 6:
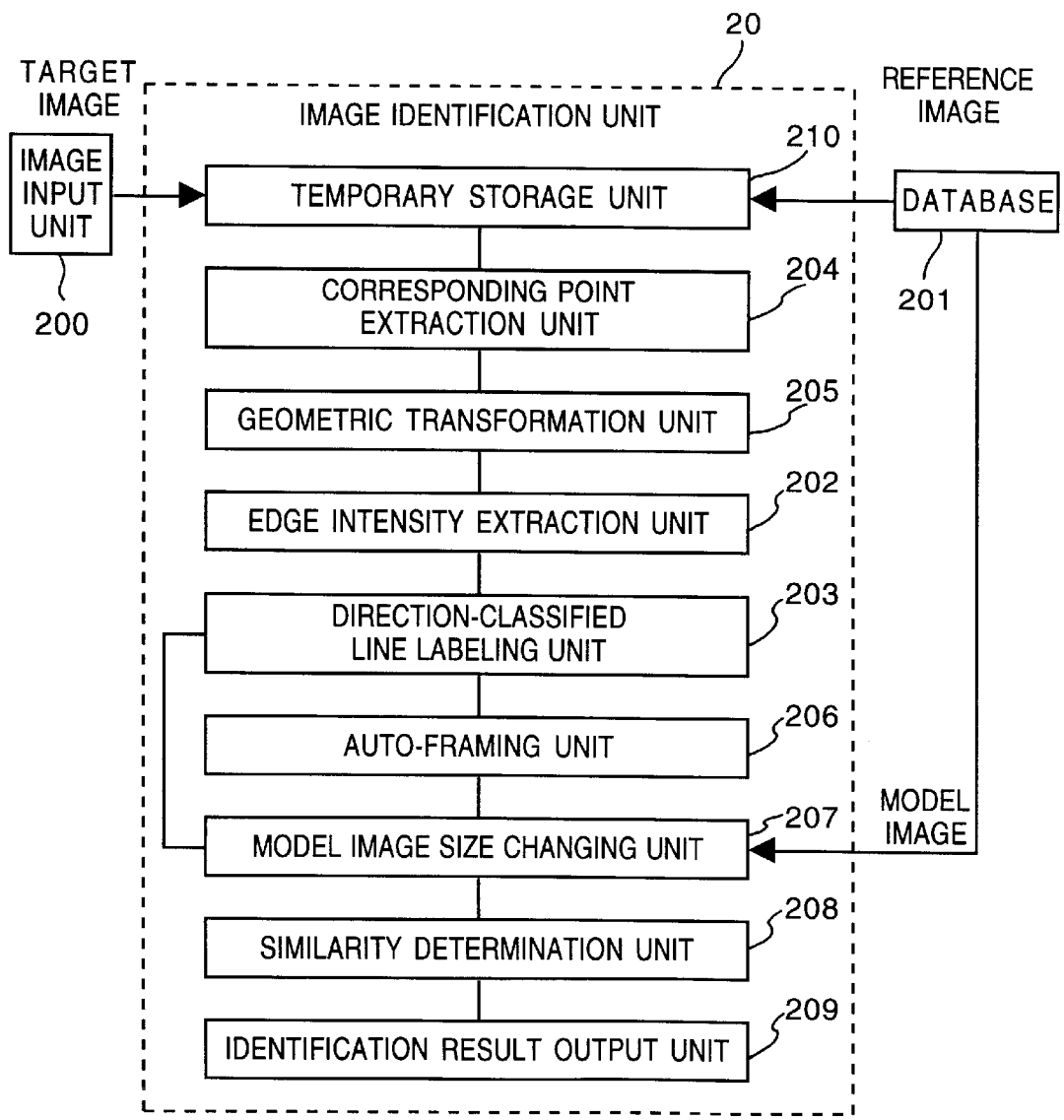
FIG. 6 is a block diagram showing the arrangement of principal part of an embodiment of an image identification apparatus according to the present invention.

The second embodiment of the present invention will be described below with reference to FIG. 6. FIG. 6 is a block diagram showing the arrangement of principal part of an embodiment of an image identification unit 20 of the present invention.

This embodiment will explain an image identification unit which identifies an object to be identified from a target image that includes the object to be identified, which is not present in a reference image, using a standard model image representing a prespecified object, and the reference image.

As shown in FIG. 6, the image identification unit 20 has a temporary storage unit 210 for temporarily storing a target image input from an image input unit 200 such as a camera, scanner, and the like, and a reference image stored in a database 201. In this embodiment, for example, an image shown in FIG. 9A is used as the target image, and an image shown in FIG. 9B is used as the reference image.

The target image and the reference image stored in the temporary storage unit 210 are supplied to a corresponding point extraction unit 204. The corresponding point extraction unit 204 normalizes (equalizes) the image sizes of the target image and reference image by enlargement/reduction processing or the like, and thereafter, executes corresponding point extraction processing. The corresponding point extraction processing is the same as that in the first embodiment described above, and a detailed description thereof will be omitted.

The processing order after the processing of this corresponding point extraction unit 204 is the same as the connection order of the respective units shown in FIG. 6. That is, the processing of a geometric transformation unit 205 is done next.

The geometric transformation unit 205 estimates an affine transformation matrix that transforms each pixel position in one image to substantially match that of the other image on the basis of the corresponding point data in a substantially common portion (e.g., a common portion excluding the object to be identified from the target image) in the reference image or target image, and executes transformation (including translation, rotation, magnification transformation, and the like) with respect to the reference image. In this case, since the target image size is not detected in advance, for example, corresponding point search and extraction are done by the corresponding point extraction unit 204 within the region ranges of 25% to 35% of the image frame width from the right and left ends of each image as in the first embodiment (see FIGS. 9A and 9B).

Figure 9C:
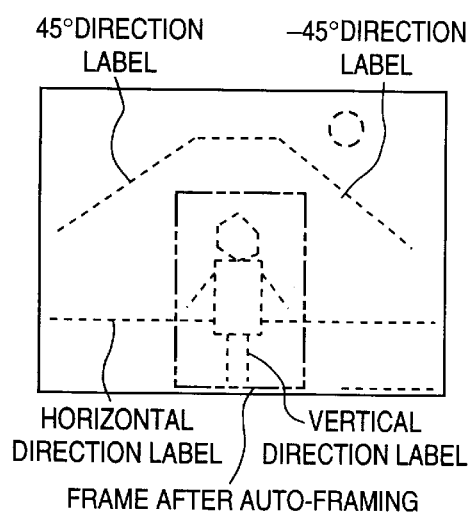
FIG. 9C shows an example of an image obtained by labeling the input image in the second embodiment of the present invention.
Figure 9D:
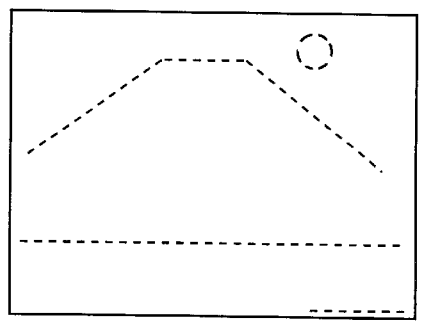
FIG. 9D shows an example of an image obtained by labeling the background image in the second embodiment of the present invention.

After the processing of the geometric transformation unit 205, the processing by an edge intensity extraction unit 202 is executed. The edge intensity extraction unit 202 extracts edge distributions in the reference image and target image after the geometric transformation based on the corresponding point data, and subsequently, a direction-classified line labeling unit 203 executes direction-classified line detection and labeling for each edge on the basis of the extracted edge distribution of the images. As a result of labeling, as shown in FIGS. 9C and 9D, one of horizontal, vertical, 45°, and −45° direction labels (indicated by dotted lines in FIGS. 9C and 9D) is assigned to each edge in the target image and reference image. As the label determination method, a direction that yields a maximum convolution value between detection operators (matrices) of the individual directions and edge data is labeled.

Subsequently, an auto-framing unit 206 executes its processing. The auto-framing unit 206 detects a region where the degree of matching of the direction-classified line label becomes smaller than a reference value on the basis of the degree of matching of the direction-classified line labels at the individual positions of the reference image and target image, and outputs a rectangular region (or a simple figure region such as an elliptic shape, polygonal shape, or the like) having a minimum size that surrounds the detected region as an existence range of the object to be identified. As a method of assigning the degree of label matching, a method of setting the degree of matching at "1" if the two regions have the same label; "−1" if they have orthogonal direction labels; and "0" if neither of the above conditions are satisfied is used. Note that the degree of matching "0" includes a case wherein a line is present in one image, but no line is present in the other image. If more label directions are used, the value of the degree of matching may be given in accordance with the distance between the two directions. In this case, the number of values that the degree of matching can assume increases. The reference value may be set at, e.g., "1" in the above-mentioned method of giving the degree of matching. The centroid and size of the existence range correspond to the positions and size of the object to be identified on the image.

With this auto-framing, as shown in, e.g., FIG. 9C, a rectangular region bounded by a two-dashed chain line is extracted as the existence range.

Figure 9E:
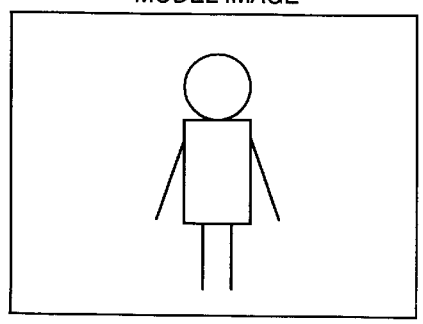
FIG. 9E shows an example of a model image in the second embodiment of the present invention.
Figure 9F:
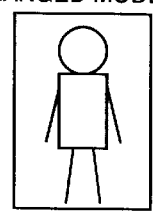
FIG. 9F shows an example of a model image after its size has changed in the second embodiment of the present invention.

Thereafter, the processing of a model image size changing unit 207 is executed. The model image size changing unit 207 changes the size of the standard model image (e.g., the vertical and horizontal sizes of the frame of the standard model image) to match the size (e.g., the vertical and horizontal sizes, or area) of the existence range of the object to be identified estimated by the auto-framing unit 206. If the frame after framing has a different aspect ratio from that of the frame of the standard model image, the vertical and horizontal sizes of the standard model image can also be changed at different magnifications so that they match each other. In this embodiment, the image shown in FIG. 9E is used as a standard model image, and a reduced standard model image shown in FIG. 9F is obtained by this size changing processing.

Figure 10A:
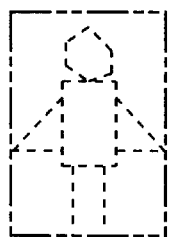
FIG. 10A shows an image example of line label data of a target image after framing in the second embodiment of the present invention.
Figure 10B:
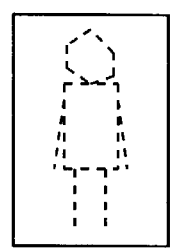
FIG. 10B shows an image example of model image line label data after its size has changed in the second embodiment of the present invention.
Figure 10C:
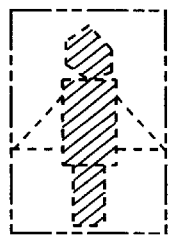
FIG. 10C shows an image example of a region with a high degree of label matching in FIG. 10A.
Figure 10D:
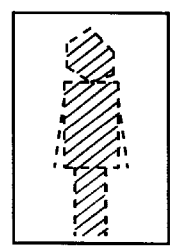
FIG. 10D shows an image example of a region with a high degree of label matching in FIG. 10B.
Figure 10E:
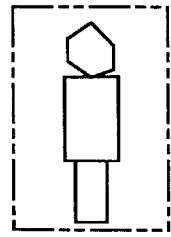
FIG. 10E shows an image example of a contour line of the region with the high degree of label matching in the second embodiment of the present invention.
Figure 10F:
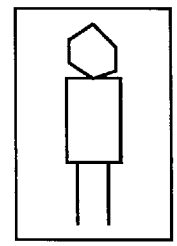
FIG. 10F shows the contour line of a model image made up of labeled line segments in the second embodiment of the present invention.

Then, the processing of a similarity determination unit 208 is executed. The similarity determination unit 208 determines similarity between the size-converted standard model image and an image portion including the object to be identified of the specified existence range in the target image. As a similarity determination method, comparison between the degrees of matching of the direction-classified line labels (comparison between the degrees of matching of line label data of images shown in FIGS. 10A and 10B) is locally done for each edge to detect regions (see FIGS. 10C and 10D) with higher degrees of matching. Furthermore, a boundary line (contour line: see FIG. 10E) of the image portion of the object to be identified is extracted, and a contour line (see FIG. 10F) defined by label components of the labeled standard model image is generated. Thereafter, the similarity between these contour lines is determined. By selecting the contour of the object to be identified on the basis of the direction-classified line label data, portions to be compared of the contours of the object to be identified and standard model can be reliably extracted at high speed as compared to the existing techniques such as active contour method, deformable template matching method, and the like. The degree of matching of the contours is determined using the degree of matching or the like of Fourier transform coefficients of encoded data obtained by polar-coordinate mapping the positions of the individual points of the contour line as a function of the distance and direction from the centroid.

As another similarity determination method, corresponding point extraction between the standard model image and the object to be identified (the same as that in the first embodiment), and statistical values such as the average, variance, or the like of the correlation coefficient values between the local regions are used. In this case, in an unmatched region between a background portion that still remains within the framing range of the target image, and a background portion (normally, plain, and uniform color and luminance level) of the standard model image, provided that no corresponding points are extracted, or the correlation or the like upon extracting the corresponding points are low, such portions are selectively removed. A region where the corresponding points are detected is divided into blocks, and the average value of the correlation coefficients between the corresponding blocks is calculated. If the calculated value is higher than a reference value, a determination result indicating the target is the same as the standard model image or belongs to the same category is output. In the case of this method, the types and the like of correlation coefficients are not particularly limited.

As still another method, the contour line of the target object in the standard model image may be extracted in advance, and may be set as an initial contour on the existence range region of the target image so that their centroids are matched. Thereafter, the contour portions to be compared may be extracted using the existing techniques such as active contour method, deformable template matching method, and the like. In this method, as for the degree of matching of color information, assuming that shapes roughly match each other, R, G, and B value differences or hue differences are calculated in respective regions, and similarity is finally determined on the basis of their average value or the total summation of their absolute values.

As another example using direction-classified line labels in similarity determination, the difference between direction-classified labels of the characteristic portion of the contour shape, especially at a maximal or minimal curvature portion, and the difference of the color information, luminance information or local spatial frequency, or region characterizing factor such as the variance, moment, or the like of a local region that inscribes the characteristic portion may be determined. In this method, a region which includes a line segment that connects the centroids of the extracted characteristic distribution and the characteristic position is basically determined as the inner side of the characteristic portion.

Note that the similarity determination method is not limited to the above-mentioned method.

When the similarity determination result is obtained, the obtained similarity result is output to an identification result output unit 209.

As described above, after the target image and reference image are normalized, the existence range of the object to be identified is specified on the basis of the differences of direction-classified line labels, and similarity within the existence range is determined, thus reliably identifying an object at high speed.

The individual units that execute the above-mentioned processing may be made by dedicated hardware units, or may be implemented by a software program that can be executed by a CPU.

THIRD EMBODIMENT

Figure 7:
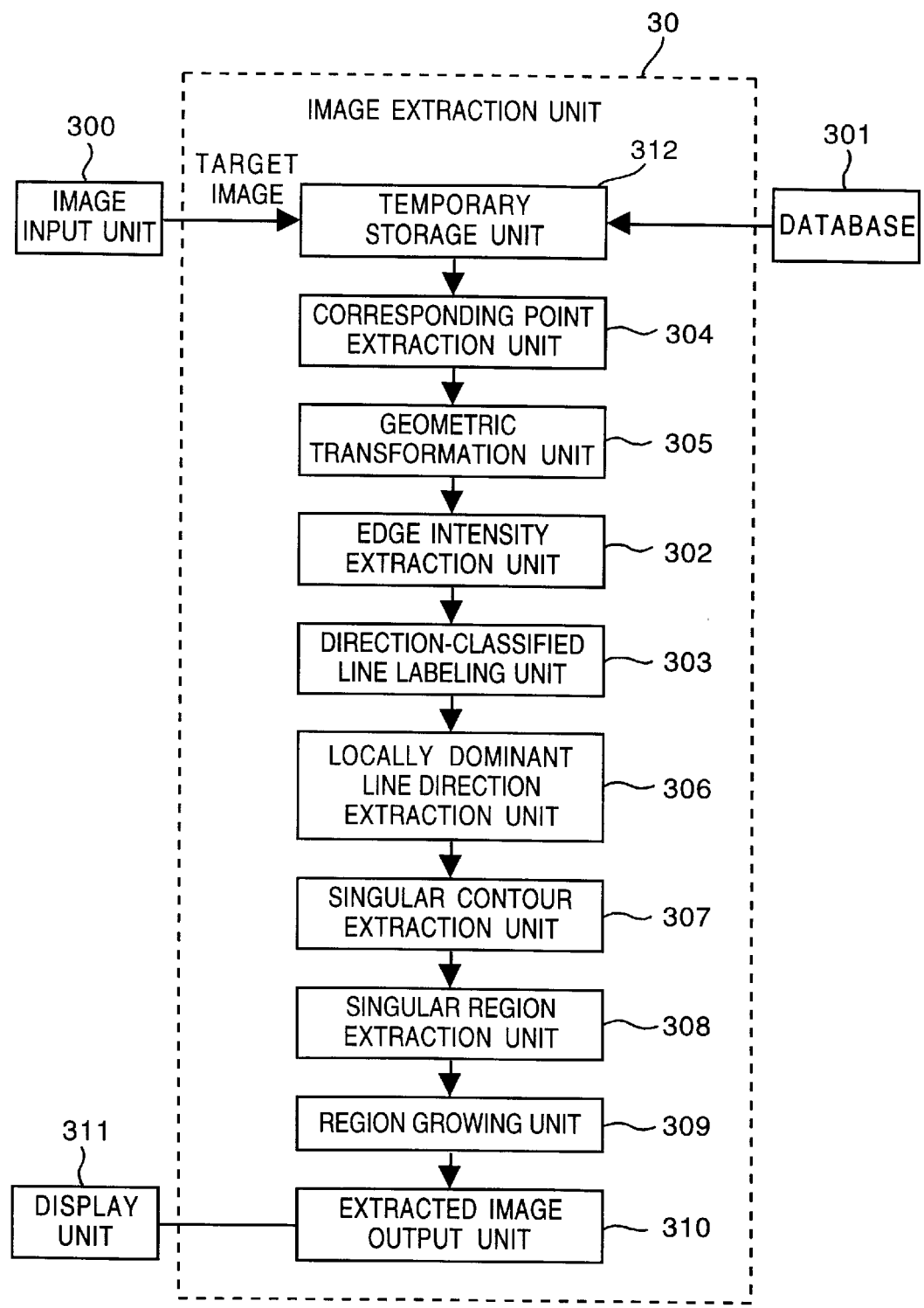
FIG. 7 is a block diagram showing the arrangement of an image extraction unit that builds another embodiment of the image segmentation apparatus according to the present invention.

The third embodiment of the present invention will be described below with reference to FIG. 7. FIG. 7 is a block diagram showing the arrangement of an image extraction unit 30 that makes up another embodiment of an image segmentation apparatus of the present invention.

Figure 13A:
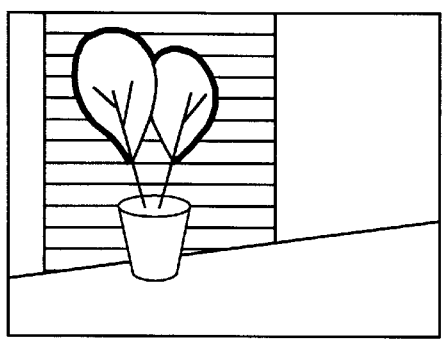
FIG. 13A shows an example of an input image in the third embodiment of the present invention.
Figure 13B:
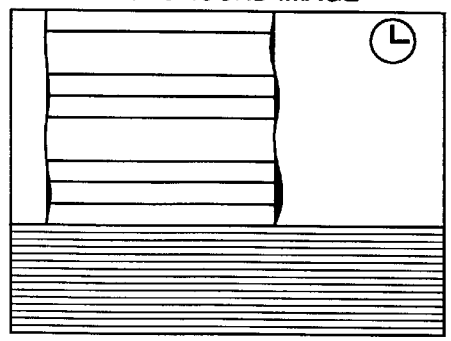
FIG. 13B shows an example of a background image in the third embodiment of the present invention.

In this embodiment, as shown in FIG. 7, typical background scenes photographed in advance, or sketches of background images created using computer graphics, painting software, or the like are used as representative background images, which are stored in a database 301. An input image including a subject as the object to be extracted is input to the image extraction unit 30 via an image input unit 300 such as an image sensing device. The image extraction unit 30 stores an input image input from the image input unit 300 in a temporary storage unit 312, and displays it on a display unit 311. The display unit 311 displays image samples of the representative background image stored in the database 301 together with the input image, and the user selects a representative background image that best matches the background of the input image from the displayed image samples. For example, when the image shown in FIG. 13A is input as the input image (target image), the image shown in FIG. 13B is selected as the representative background image that best matches that input image.

A corresponding point extraction unit 304, edge intensity extraction unit 302, and direction-classified line labeling unit 303 execute processing for the input image and representative background image as in the first embodiment, and a geometric transformation unit 305 geometrically transforms the background image.

In this embodiment, especially, in order to increase the tolerance for different details between the representative background image and the background portion in the input image, the two images are subjected to direction-classified line labeling at a low resolution before corresponding extraction, and corresponding point extraction is done based on the directions of edge feature points at that resolution. More specifically, the two images are smoothed using a filter (e.g., a Gaussian filter) having a predetermined size (or are divided into blocks and pixel values are replaced by average values in the individual blocks), and corresponding point extraction is done after edge detection and labeling.

In corresponding point extraction, block matching with a predetermined size having each edge as the center may be performed. Similarity may be determined based on the degree of matching of direction labels in addition to correlation coefficients described in the first embodiment. Note that the degree of matching is set to relax the tolerance for different direction labels, and is set to ignore a difference of, e.g., about 10°. When corresponding point extraction uses both direction labels and color information, direction label differences are preferentially used, and a relatively high tolerance is set for color differences.

In the transformation processing using an estimated geometric transformation matrix, as has been described in the first embodiment, transformation from one point to the other corresponding point may be done using the transformation matrix estimated for the corresponding points, pairs of corresponding points, each of which yields position errors between the transformed point and the estimated corresponding point greater than a predetermined threshold value, may be excluded, and the transformation matrix may be estimated again using the remaining pairs of corresponding points. Also, such selection of the corresponding points may be repeated until the average value of the above-mentioned errors becomes equal to or smaller than a predetermined threshold value.

Alternatively, a geometric transformation matrix may be locally estimated for respectively divided blocks, and transformation may be done by obtaining different transformation matrices for respective blocks.

A locally dominant line direction extraction unit 306 divides the representative background image into a plurality of blocks having an appropriate size, performs a voting for the number of pixels for each line direction in each block, and determines the majority direction label as a dominant line direction of that block.

A singular contour extraction unit 307 compares each edge-direction classified line label in the input image with the locally dominant line label of each block including a point at an identical position to that at the edge of the input image or a direction-classified line label assigned to that edges in the representative background image, and if they are different from each other, that edge is extracted as a singular contour of the subject.

Figure 13C:
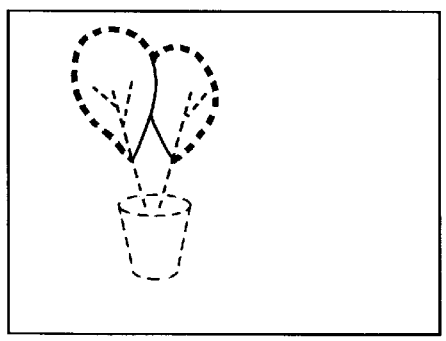
FIG. 13C shows an example of the extracted singular contour set with a minimum size of processing frame that surrounds the object to be extracted in advance in the third embodiment of the present invention.

In general, since it is hard to specify the contour of the subject to be extracted using the line direction labels alone, the singular contour is preferably extracted after a processing frame having a minimum size that surrounds the subject to be extracted is manually set in advance. FIG. 13C shows an example of the extracted singular contour.

A singular region extraction unit 308 extracts features such as colors, luminance levels, and the like of two local regions locally separated by a line, whose line length is equal to or larger than a reference value, as attribute information of that line together with its direction label, and locally compares attribute differences between the input image and representative background image, thereby extracting a partial region having a color or luminance inherent to the subject as a singular region.

Figure 13D:
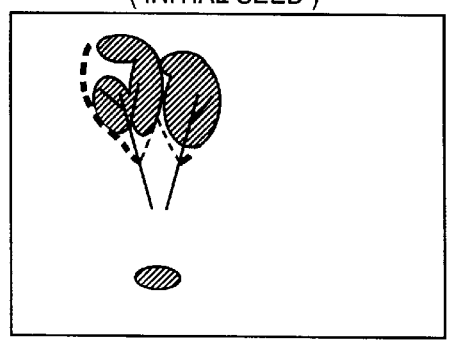
FIG. 13D shows an example of an image extracted from the input image shown in FIG. 13A in the third embodiment of the present invention.

More specifically, as for, in particular, colors in the attribute information, the unit 308 determines the degree of inherence of the subject by executing thresholding of local (e.g., 5×5 pixel size) average values of R, G, and B components or absolute difference values of hue and saturation associated with the local average values (if the value if higher than a threshold value, a singular region inherent to the subject is determined). The threshold value can be set on the basis of difference in color component values for the maximum peak level of histograms associated with, e.g., color components, which are locally generated in each of the input image and representative background image. Note that the local region size for which a histogram is to be generated is set to be larger than that for calculating the average values (e.g., 30×30 pixel size). For example, a higher threshold value is set for the larger difference in color component value of the maximum peak. In this case, as singular regions for the input image shown in FIG. 13A, regions painted in black are extracted, as shown in FIG. 13D.

Note that the singular contour extraction unit 307 may be set to preferentially extract line components adjacent to a region with different attribute values on the basis of the output from the singular region extraction unit 308.

The extracted singular region corresponds to the initial mask region in the first embodiment, and a region growing unit 309 executes region growing of the extracted singular region. The growing processing of the region growing unit 309 is the same processing as that in the first embodiment.

Figure 13E:
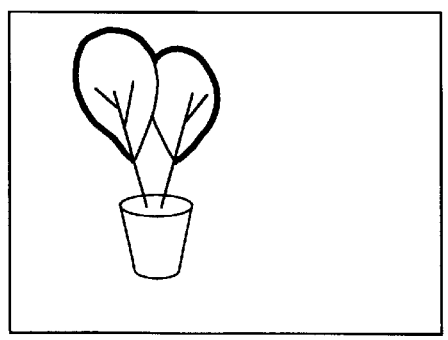
FIG. 13E shows the extraction result from the input image shown in FIG. 13A in the third embodiment of the present invention.

The grown mask region is used as a subject mask region, and a region corresponding to that region, i.e., a subject region, is extracted from the input image by an extracted image output unit 310. Image data in the extracted region is output to the display unit 311, which displays the extracted image, i.e., the subject. As a result of extraction, for example, an image shown in FIG. 13E is extracted from the input image shown in FIG. 13A.

FOURTH EMBODIMENT

Figure 14:
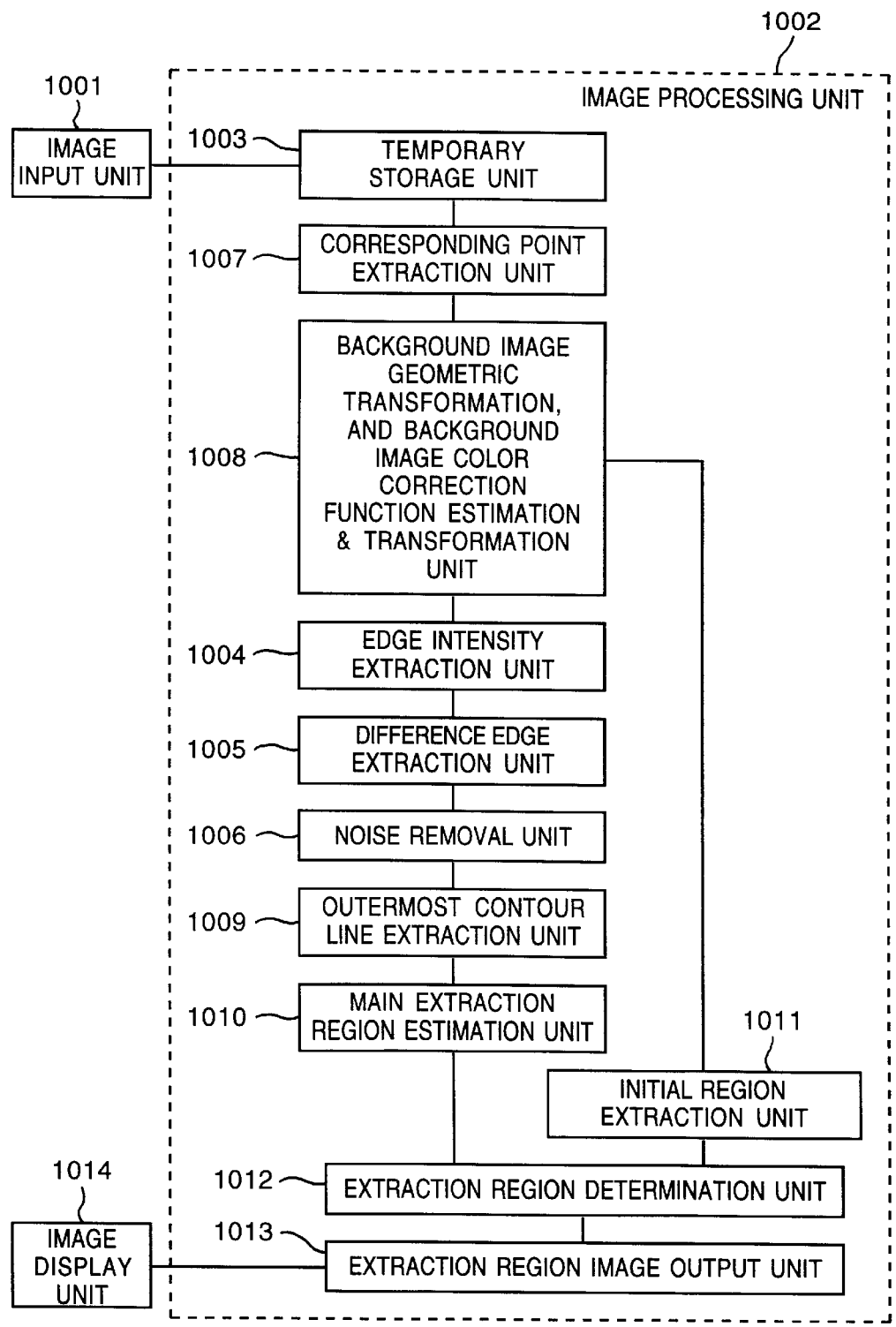
FIG. 14 is a block diagram showing the arrangement of an image processing apparatus according to the fourth embodiment of the present invention.

FIG. 14 shows the arrangement of an image processing unit 1002 according to the fourth embodiment of the present invention. An image processing apparatus according to the fourth embodiment of the present invention comprises an image input unit 1001, image processing unit 1002, and image display unit 1014.

The image input unit 1001 comprises an optical imaging system including a lens, stop, and their driving control units, an image sensor, a video signal processing circuit, an image recorder, and the like.

Of images input from the image input unit 1001, an input image including the object to be extracted, i.e., a subject, will be referred to as a main image hereinafter, and an image of a background alone without any subject image will be referred to as a sub image hereinafter. These main and sub images may be photographed at different times.

The image processing unit 1002 comprises a temporary storage unit 1003 for temporarily storing the main and sub images, a corresponding point extraction unit 1007 for extracting corresponding points between a background image and input image, a unit 1008 for geometrically transforming the background image on the basis of corresponding point data, estimating a color correction function of the background image on the basis of pixel value data (e.g., R, G, and B values and the like) of the corresponding points, and transforming the background image based on the estimated function (to be referred to as a "transformation unit 1008" hereinafter), an edge intensity extraction unit 1004 for the two images, a difference edge extraction unit 1005, a noise removal unit 1006, an outermost contour line extraction unit 1009 for difference edges, a main extraction region estimation unit 1010, an initial region extraction unit 1011 based on thresholding of pixel value differences between the main and sub images, an extraction region determination unit 1012, and an extraction region image output unit 1013 for outputting an extraction region image to the image display unit 1014. The edge intensity extraction unit 1004 makes up an edge distribution extraction unit described in the scope of claims, and the extraction region determination unit 1012 makes up a region specifying unit described in the scope of claims.

Note that the image processing unit 1002 may be an internal storage device, external storage device, or storage medium of a computer comprising a software program that can implement the processing to be described below, in place of the arrangement shown in FIG. 14. Similarly, the processing program may be stored in a gate array. Furthermore, the image processing unit 1002 may be built in the image input unit 1001.

Figure 15:
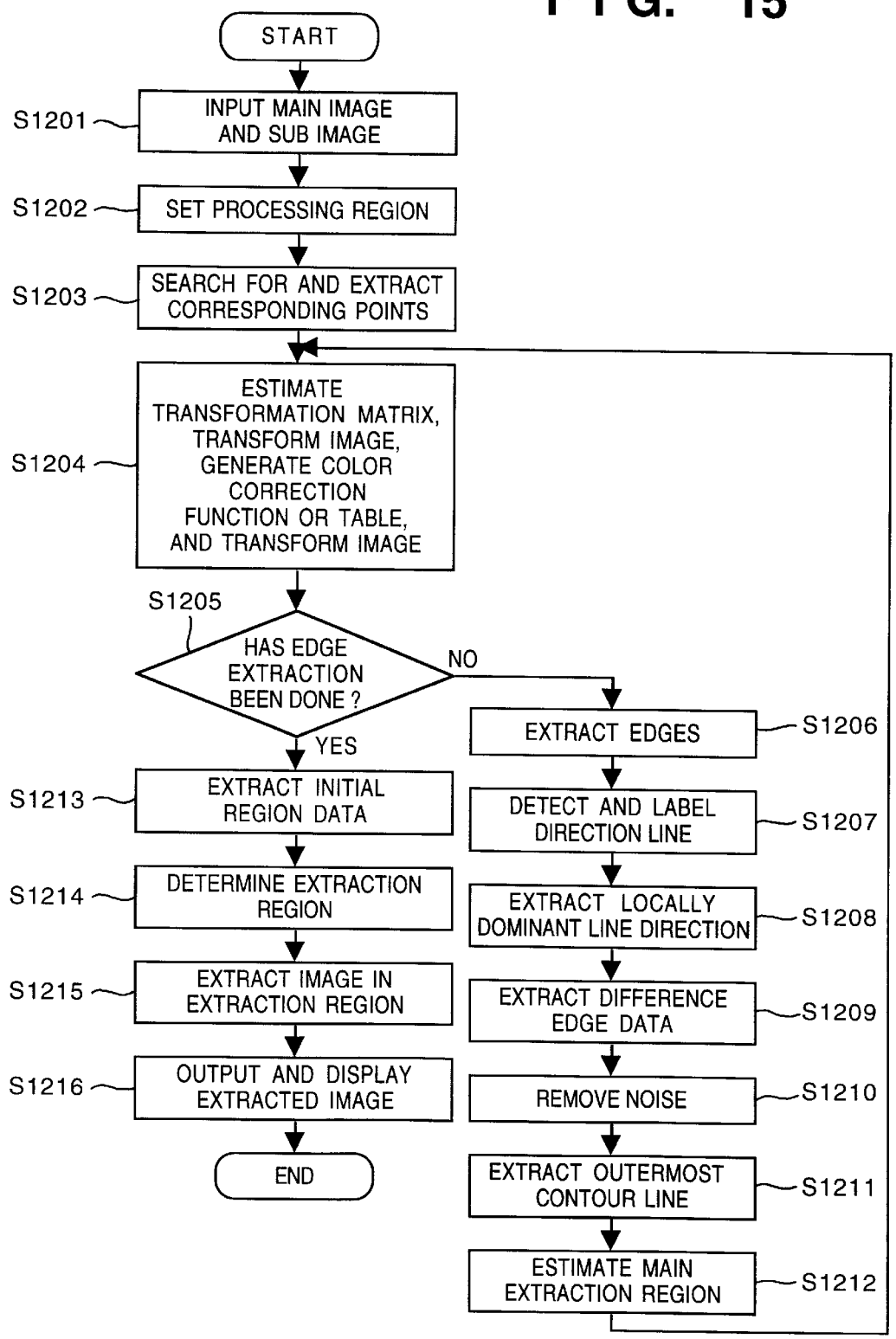
FIG. 15 is a flow chart showing the image extraction processing to be executed by the image processing apparatus according to the fourth embodiment of the present invention.

FIG. 15 shows the image extraction processing executed by the image processing apparatus according to the fourth embodiment of the present invention.

Figure 18A:
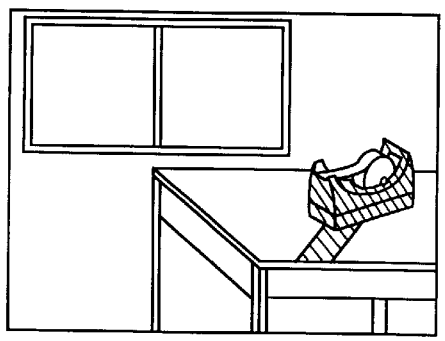
FIG. 18A shows an example of a main image in the fourth embodiment of the present invention.
Figure 18B:
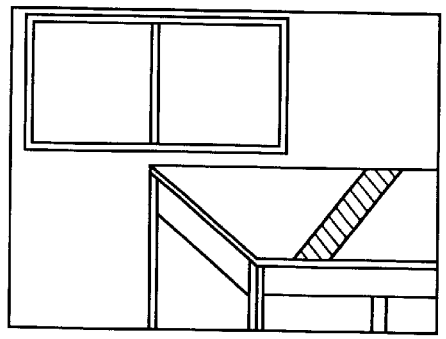
FIG. 18B shows an example of a sub image in the fourth embodiment of the present invention.

The image input unit 1001 inputs a main image including a subject, and a sub image of a background alone without any subject image (step S1201). FIG. 18A shows an example of the main image, and FIG. 18B shows an example of the sub image. A processing region including the subject is set on the main image by automatic processing or a manual pointing unit such as a mouse or the like (step S1202). Note that the processing region need not always be set.

Subsequently, the corresponding point extraction unit 1007 searches for and extracts corresponding points from regions of 25% to 35% of the image frame width from the right and left ends of the two images or outside the image extraction processing region set in step S1202 (step S1203). The corresponding point extraction is done for the purpose of absorbing conditional differences such as variations of the view point position, variations such as positional offsets, rotations, and the like of images due to a camera shake, variations of the magnification, and the like by geometrically transforming one of the main and sub images, as will be described below.

As the corresponding point extraction method, block matching or the like for obtaining points that yield a maximum correlation coefficient between blocks, which have the individual points of the images as the centers, and a predetermined size may be used. However, the present invention is not limited to such specific method, and other methods may be used.

Furthermore, the transformation unit 1008 matches the pixel positions of one image with the corresponding pixel positions of the other image using the obtained corresponding point position data. That is, the unit 1008 estimates a transformation matrix and executes transformation based on the matrix by geometrically transforming (especially, affine transforming) one image, e.g., the entire sub image or its portion, so that a certain position of the one image is transformed to an identical position of the other image. Furthermore, the unit 1008 generates a color correction function or table for matching pixel value levels at the corresponding points between the main and sub images, and transforms one image (step S1204). The geometric transformation includes translation, rotation, enlargement/reduction having a given point as the center, or their combination, and the color correction is done for the sub image.

In this case, the transformation function or table for R, G, and B pixel values of the corresponding points between the main and sub images, i.e., transformation values for 0 to 255 levels of R, G, and B pixel values, are estimated by recursive analysis based on, e.g., the method of least squares. The purpose of color correction is to stabilize the precision of image extraction to be described later by absorbing variations of the exposure condition, white balance characteristics, and the like between the main and sub images.

In step S1205, a determination unit (not shown) checks if the edge intensity extraction unit 1004 has executed edge extraction of the two images. If NO in step S1205, the edge intensity extraction unit 1004 performs edge extraction of the two images (step S1206), and also performs direction-classified line detection and direction-classified labeling (step S1207).

Figure 19A:
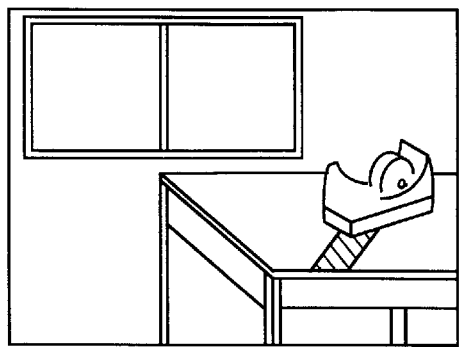
FIG. 19A shows an example of the extraction result of edge data of the main image in the fourth embodiment of the present invention.
Figure 19B:
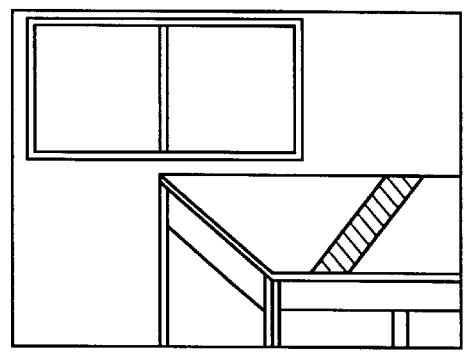
FIG. 19B shows an example of the extraction result of edge data of the sub image in the fourth embodiment of the present invention.

FIG. 19A shows an example of the extraction result of edge data from the main image, and FIG. 19B shows an example of the extraction result of edge data from the sub image.

The edge extraction in step S1206 uses differential operators such as SOBEL operators and the like, and the direction-classified line detection method in step S1207 normally uses the one based on convolution calculations between kernels (which are given by matrices) defined in units of directions and an image. In this embodiment as well, labeling is done based on convolution values. Furthermore, an image is divided into blocks having an appropriate size (e.g., 5×5 pixel size), and the total number of label edges in units of directions is obtained in each block. The majority label in each block is determined as a locally dominant line direction in that block, and is extracted as a line direction label representative value of that block (step S1208).

After the above-mentioned labeling processing, difference edge data is extracted by performing thresholding of intensity differences of edge data between the main and sub images (step S1209). In noise removal processing of difference edge data, an edge region which have the same direction-classified labels and remain as difference edges is removed (step S1210).

As another noise removal processing, smoothing using, e.g., a median filter, or removal of isolated points or an isolated region having a predetermined size or less may be done. As a result of such processing, noise components on difference edge data that remain on the background portion are removed nearly perfectly, but some edges or the like having the same direction components as those of the background portion may also be removed from the contour line of the object to be extracted.

Subsequently, the outermost contour line extraction processing of the difference edge data is done (step S1211). The outermost contour line extraction processing of the difference edge data in step S1211 in FIG. 15 will be described below with reference to FIG. 16.

The gap (missing parts) positions on the outermost line (i.e., the outermost contour line) of the difference edge data are extracted (step S401) and are linked (step S402), and outermost contour line tracing data is then extracted (step S403).

Figure 19C:
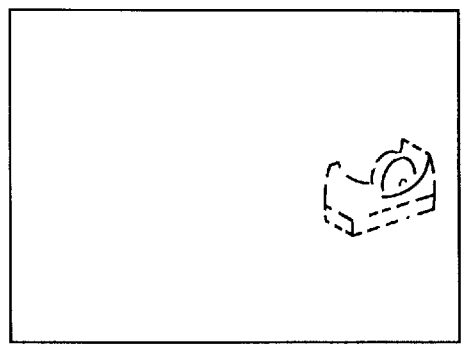
FIG. 19C shows an example of difference edge data after noise removal in the fourth embodiment of the present invention.
Figure 19D:
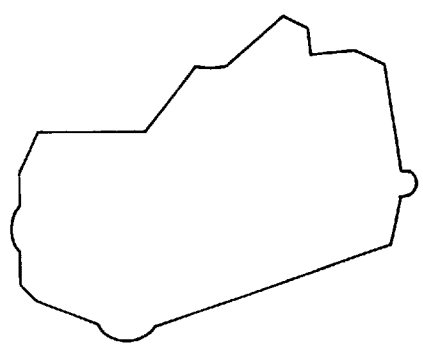
FIG. 19D shows an example of outermost contour tracing data after gap detection and linking processing in the fourth embodiment of the present invention.

FIG. 19C shows an example of the difference edge data after noise removal, and FIG. 19D shows an example of the outermost line tracing data after gap detection and linking processing. In the following description, the horizontal (widthwise) direction of the image frame agrees with the X-axis direction, and the vertical direction (longitudinal) direction agrees with the Y-axis direction.

Figure 17:
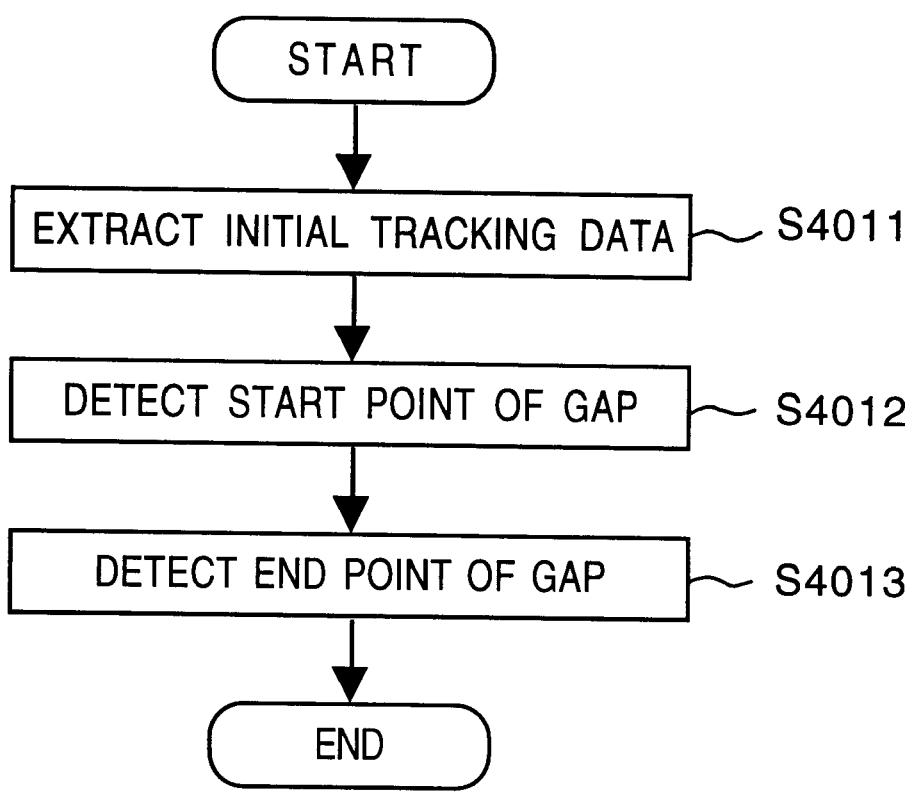
FIG. 17 is a flow chart showing the detection processing of the gap positions on the outermost contour line of the difference edge data.

The gap position detection processing (step S401) is attained by the processing shown in FIG. 17. That is, initial tracing data are extracted on the upper, lower, right, and left sides in step S4011.

Figure 20A:
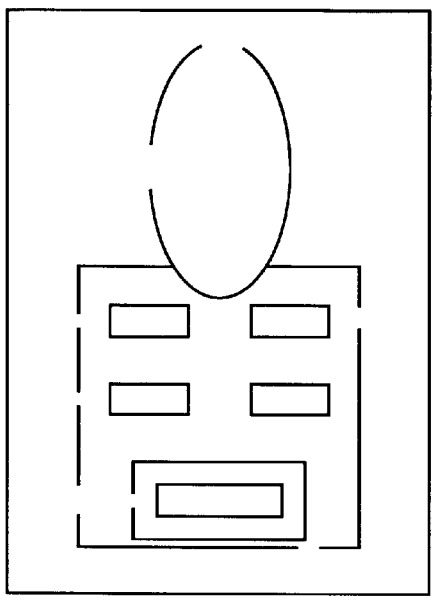
FIG. 20A shows an example of difference edge with missing portion (deficiency) after noise removal in the fourth embodiment of the present invention.
Figure 20B:
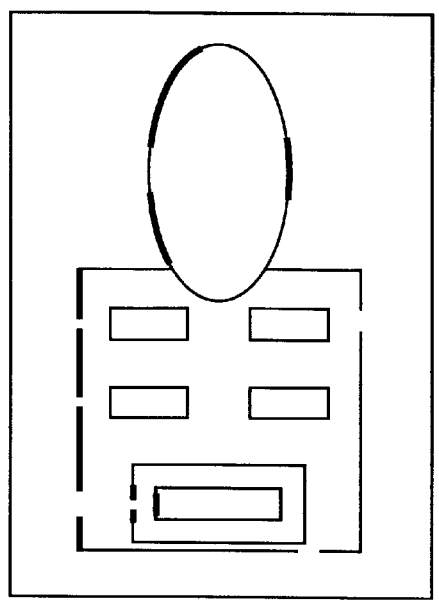
FIG. 20B shows the left outermost initial tracing data indicated by the bold lines in the fourth embodiment of the present invention.

More specifically, on the upper and lower sides of the image frame, the uppermost and lowermost difference edge positions (Y-coordinates) in the vertical direction (sub-scanning direction) of the individual scanning positions are extracted while scanning from the left to right (main scanning direction). Also, on the right and left sides of the image frame, outermost difference edge positions (X-coordinates) located at the rightmost and leftmost positions at the individual scanning positions are extracted while scanning from the bottom to top. FIG. 20A shows an example of defective difference edge data after the noise removal, and FIG. 20B shows outermost initial tracing data on the left side indicated by bold lines.

Start point detection processing (step S4012) for filling the gaps obtains the predicted position of the next outermost difference edge in the scanning direction (in the direction of an arrow in FIG. 20B), and when no difference edge is present in the vicinity of the predicted position at the next scanning position or in the vicinity of the current scanning position, the tracing position at the current scanning position is recorded as a start point candidate position of a gap.

Figure 20C:
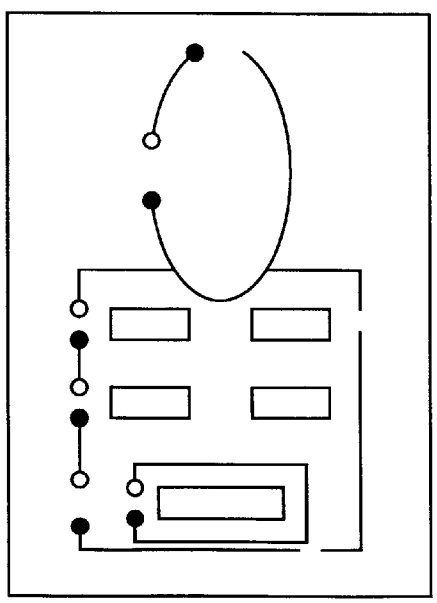
FIG. 20C shows the start point candidates of gaps to be bridged over indicated by full circles and the end point candidates indicated by open circles on the left outermost lines in the fourth embodiment of the present invention.

In step S4013, gap end point detection position is done. That is, when no difference edge is present in the vicinity of a scanning position immediately before the outermost difference edge position at the current scanning position, the current outermost difference edge position is recorded as a gap end point candidate position. FIG. 20C shows the gap start point candidates as full circles and end point candidates as open circles on the left outermost lines.

Furthermore, gap linking processing (step S402) selects an end point position for the gap as a most probable linking combination from a plurality of end point candidate positions located in the scanning direction for each start candidate position of the corresponding gap, and obtains connected data by linear interpolation, fitting using an approximated curve, tracing edge data of the main image, or the like between the start and end point positions. As an example of a method of selecting a linking pair, a combination with the highest rate of edge presence in the main image along a line segment obtained by linear interpolation between the candidate positions or the like is preferably used.

On the other hand, using initial region data (to be described later), in consideration of coincidence rate between the above-mentioned linearly interpolated line segment and the contour of the initial region or the sum of the rate of existence of the line segment on the edge and the rate of existence of the line segment on the initial region contour, or a combination with the higher ratio may be preferentially selected.

Figure 20D:
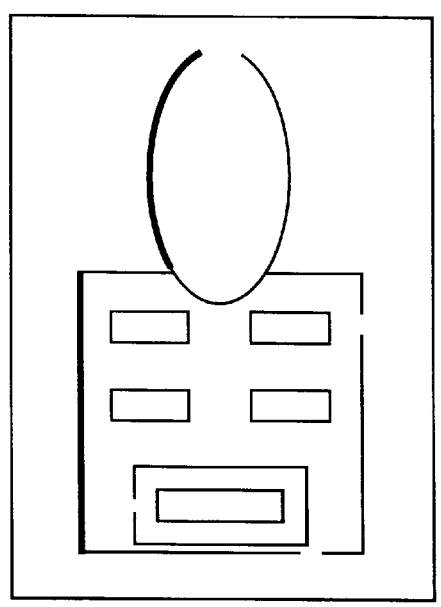
FIG. 20D shows the linking and tracing result of the left outermost contour line in the fourth embodiment of the present invention.

Furthermore, in the outermost contour line tracing data extraction processing (step S403), the outermost line tracing data of the difference edge data are obtained for the upper, lower, right, and left sides after or while executing the above-mentioned linking processing. FIG. 20D shows the linking and tracing result of the left outermost contour line.

The effects of the processing shown in FIGS. 16 and 17 will be explained below.

When a light shadow is present in the vicinity of the object to be extracted, only the contour of a target region except for the shadow can be automatically extracted. In this case, binary edge data obtained using a relatively high threshold value does not include any contour of the shadow itself.

In outermost contour line extraction, prior to the initial tracing data extraction processing (step S4011), an isolated outermost contour line on a shadow may be removed. That is, when a line segment is an isolated line segment which is not linked to any other edge elements on the edge data of the main element and has a lower gray level of the pixel value than that at an identical position on the sub image, that line segment is removed. With this processing, even when a shadow has high contrast part, the entire shadow can be removed if it has low contrast part in other portions.

As another effect, the contour line of the object to be extracted can be stably extracted even when the difference edge data have gaps on the contour line of the object to be extracted in the case wherein a partially low-contrast portion is present on the boundary line between the object to be extracted and background and the edge data of the main image cannot be extracted, or in the case wherein the main and sub images have similar edge direction components in the vicinity of the boundary line between the object to be extracted and background.

Furthermore, as the effect of a combination with noise removal (step S1210) based on the degree of matching of labels in terms of dominant directions in the vicinity of edges, when edges are distributed on the background portion at high density, and the background portion has high edge contrast, background edges that are apt to remain can be nearly perfectly removed, and only the contour of the object to be extracted can be extracted with high precision.

Figure 21A:
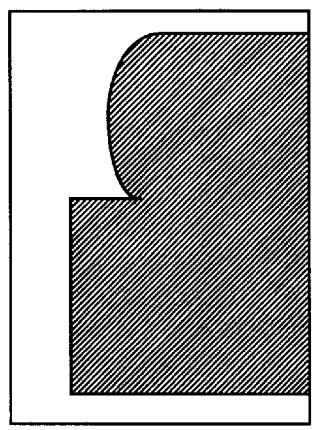
FIG. 21A shows a background portion (blank region) obtained on the basis of the linked outermost contour line obtained on the left side in the fourth embodiment of the present invention.
Figure 21B:
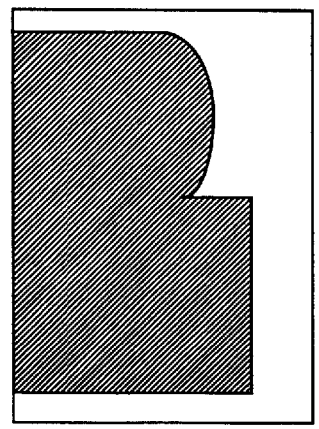
FIG. 21B shows a background portion (blank region) obtained on the basis of the linked outermost contour line obtained at the right side in the fourth embodiment of the present invention.
Figure 21C:
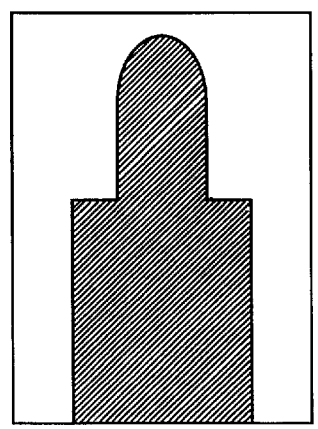
FIG. 21C shows a background portion (blank region) obtained on the basis of the linked outermost contour line obtained at the upper side in the fourth embodiment of the present invention.
Figure 21D:
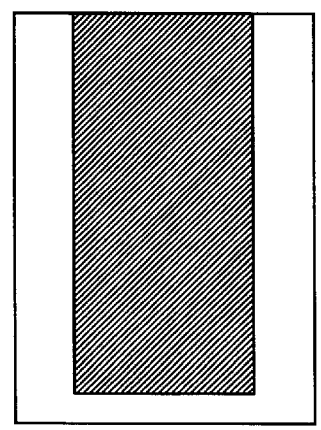
FIG. 21D shows a background portion (blank region) obtained on the basis of the linked outermost contour line obtained at the upper side in the fourth embodiment of the present invention.
Figure 21E:
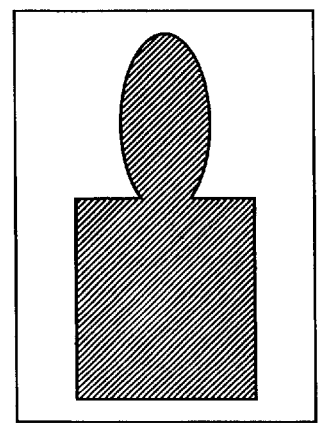
FIG. 21E shows the logical OR of the background regions shown in FIGS. 20A to 20D in the fourth embodiment of the present invention.

Referring back to FIG. 15, the main extraction region estimation unit 1010 performs main extraction region estimation processing (step S1212). This processing obtains a background portion region other than the subject to be extracted by ORing outer regions associated with respective outermost line data (e.g., as for the outermost line tracing data on the right side, a region on the right side of the outermost line). FIG. 21A shows a background portion (blank region) obtained based on the linked outermost contour line obtained at the left side, FIG. 21B shows a background portion (blank region) obtained based on the linked outermost contour line obtained at the right side, FIG. 21C shows a background portion (blank region) obtained based on the linked outermost contour line obtained for the upper side, and FIG. 21D shows a background portion (blank region) obtained based on the linked outermost contour line obtained at the lower side. FIG. 21E shows the OR of the background regions shown in FIGS. 21A to 21D, and the black region indicates a main extraction region.

With such logic calculations, even when one of the outermost contour line extracted data from the four sides, i.e., upper, lower, right, and left sides traces the edge data of the background portion due to the influences of noise or the like, it can be corrected by using tracing data from other sides.

Figure 18C:
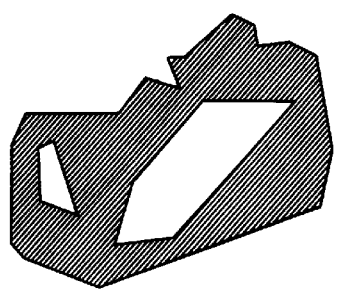
FIG. 18C shows an example of a mask region obtained as a result of initial region extraction in the fourth embodiment of the present invention.
Figure 18D:
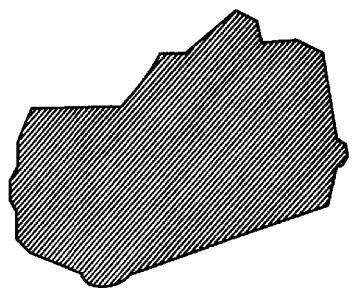
FIG. 18D shows an example of a main extraction region in the fourth embodiment of the present invention.

A region obtained by excluding the background region portion from the image frame is output as a main extraction region. FIG. 18D shows an example of the main extraction region. As can be seen from FIG. 18D, normally, when noise components remain on the difference edges, the main extraction region does not always accurately express the entire subject shape.

Note that the outermost contour line extraction processing (step S1211) is not limited to the above-mentioned method. For example, contour edges of the region to be extracted may be obtained as a closed loop while executing the gap linking processing and tracing processing of gap start and end points. In this case, the main extraction region estimation processing (step S1212) outputs a region inside the closed loop as the main extraction region.

After the main extraction region estimation processing in step S1212 has ended, the flow returns to step S1204, and the determination unit (not shown) checks again in step S1205 if edge extraction has been done. As described above, since edge extraction has been done in step S1206, the flow advances to step S1213.

In step S1213, the initial region extraction unit 1011 executes the following initial region data extraction processing. This processing extracts an initial region by performing thresholding or the like of pixel value differences (R, G, and B values, hue values, or saturation values) for respective pixels of the main and sub images. When a relatively high threshold value is set, the influences of variations of pixel values caused by noise and different photographing conditions can be eliminated, and a light shadow and the like can be removed. The initial region data is represented by binary data so that a region corresponding to the object to be extracted has a value "0", and the background region has a value "1".

In general, when difference data are merely subjected to thresholding, minute noise components often remain unremoved. For this reason, noise components are removed from the initial region data. For example, isolated points or isolated regions having small areas on the background portion are removed. FIG. 18C shows a mask region obtained as a result of initial region extraction (a region corresponding to the object to be extracted is painted in black).

In an arbitrary combination of a background and object to be extracted, the above-mentioned initial region rarely accurately expresses the region of the object to be extracted. That is, when the main and sub images include, in identical portions, partial regions which have similar R, G, and B levels or their local statistical values (average values, standard deviations, or the like), the partial regions remain unextracted after the thresholding.

Subsequently, extraction region determination processing is performed for the purpose of extracting an accurate (most likely) object region by combining the above-mentioned main extraction region and the initial region (step S1214). The contour tracing data of the main extraction region and initial region are obtained by scanning on the upper, lower, right, and left sides as in the outermost contour line extraction processing.

Figure 18E:
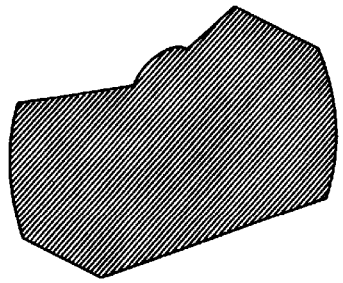
FIG. 18E shows an example of an extraction region obtained by extraction region determination processing (step S1214) in the fourth embodiment of the present invention.

As the contour line determination processing of an extraction region, for example, the following processing is executed. That is, when the difference between the contour line positions of the initial region and main extraction region is small at each position in the scanning direction, and the edge of the main image is present on the contour line of the initial region, the contour line position of the initial region is selected. On the other hand, when the difference between the contour line positions is large and the edge of the main image is present on the contour line of the main extraction region, the contour line position of the main extraction region is selected. As another method of selecting the contour line position, the contour line position of the object to be extracted may be obtained by, e.g., a statistical processing technique (most likelihood estimation or the like) using image data, edge distribution data, and the like in the vicinity of each contour line position. Note that FIG. 18E shows an example of the extraction region obtained by the extraction region determination processing (step S1214).

Figure 18F:
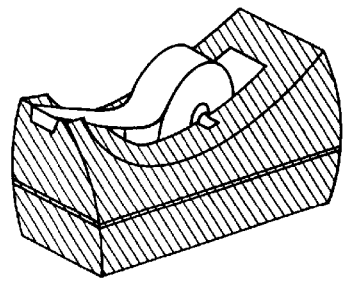
FIG. 18F shows an example of the finally extracted image in the fourth embodiment of the present invention.

In the image extraction processing of the extraction region, image data (pixel values; R, G, and B values) of the main image on the determined extraction region is extracted (step S1215), and the extracted image data is converted into an appropriate data format by the extraction image output unit 1013 to correct the R, G, and B values for appropriate color matching with display unit. Thereafter, the unit 1013 outputs the extracted image, and the image display unit 1014 displays the output extracted image (step S1216), thus ending this processing. FIG. 18F shows the finally extracted image.

As described above, according to the fourth embodiment, the image input unit 1001 inputs a main image including a specific image region to be extracted, and a sub image which does not include any specific image region to be extracted. The edge intensity extraction unit 1004 performs edge extraction of the two images (step S1206).

The intensity differences of the edge data of the main and sub images extracted by the edge extraction are subjected to thresholding to extract difference edge data (step S1209), and the extracted difference edge data are subjected to outermost contour line extraction processing (step S1211).

The main extraction region estimation unit 1010 estimates a main extraction region in the main image from the outermost contour line extracted by the above-mentioned processing, and the initial region extraction unit 1011 extracts an initial region by performing thresholding or the like for pixel value differences or the like between the main and sub images.

The extraction region determination unit 1012 performs extraction region determination processing by combining the above-mentioned main extraction region and initial region to extract an accurate (most likely) object region (step S1214). Therefore, (i) a specific image region can be precisely extracted from the main image including the specific image region to be extracted, and the sub image which does not include any specific image region to be extracted, (ii) the specific image region can be precisely extracted even when the specific image region to be extracted includes a region similar to an image which is not to be extracted, (iii) the specific image region can be precisely extracted even when an image which is similar to a specific image to be extracted and is not to be extracted is present in the vicinity of the specific image region to be extracted, and (iv) the specific image region can be precisely extracted even when the specific image region to be extracted includes many regions similar to an image which is not to be extracted.

FIFTH EMBODIMENT

Figure 22:
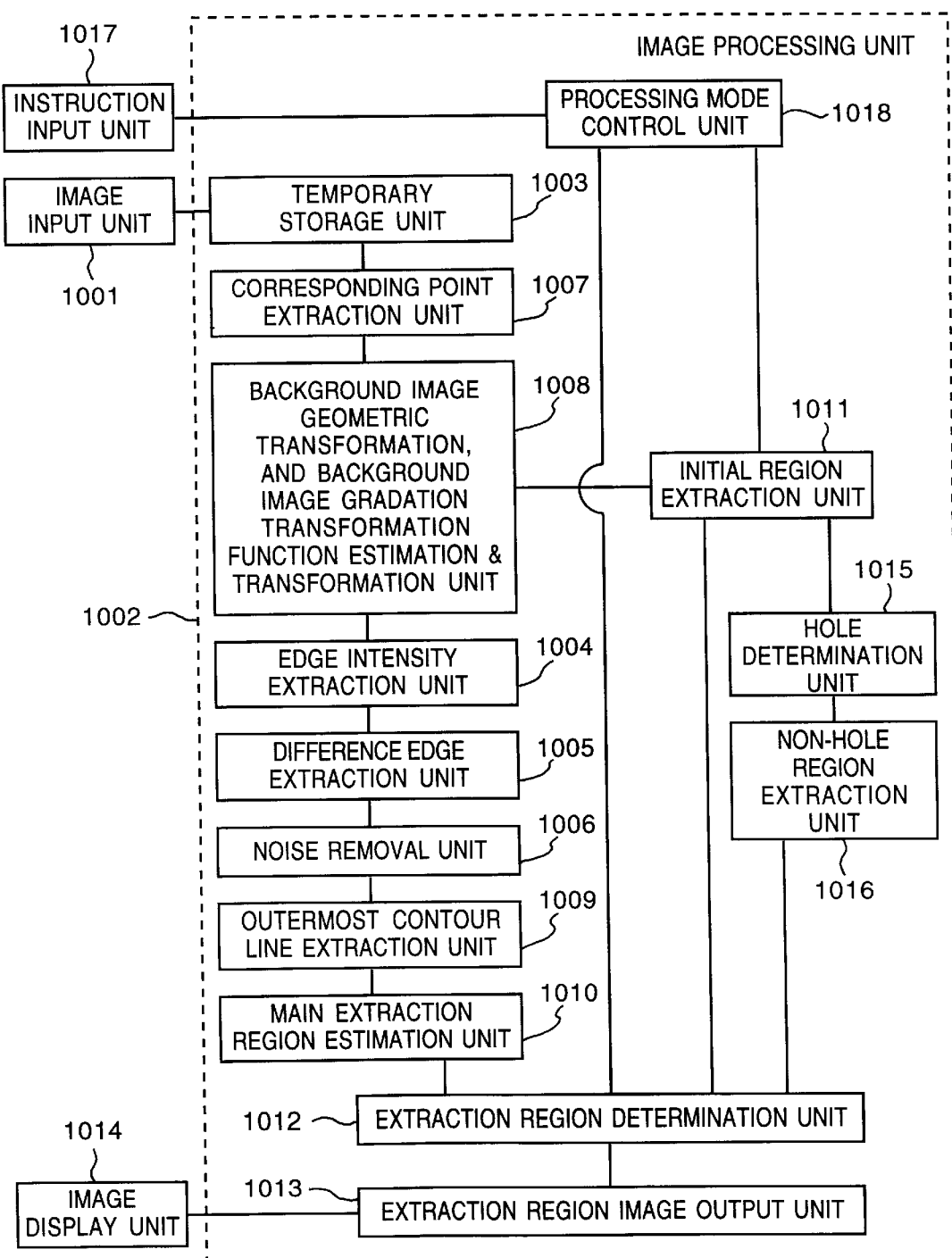
FIG. 22 is a block diagram showing the arrangement of an image processing apparatus according to the fifth embodiment of the present invention.
Figure 23:
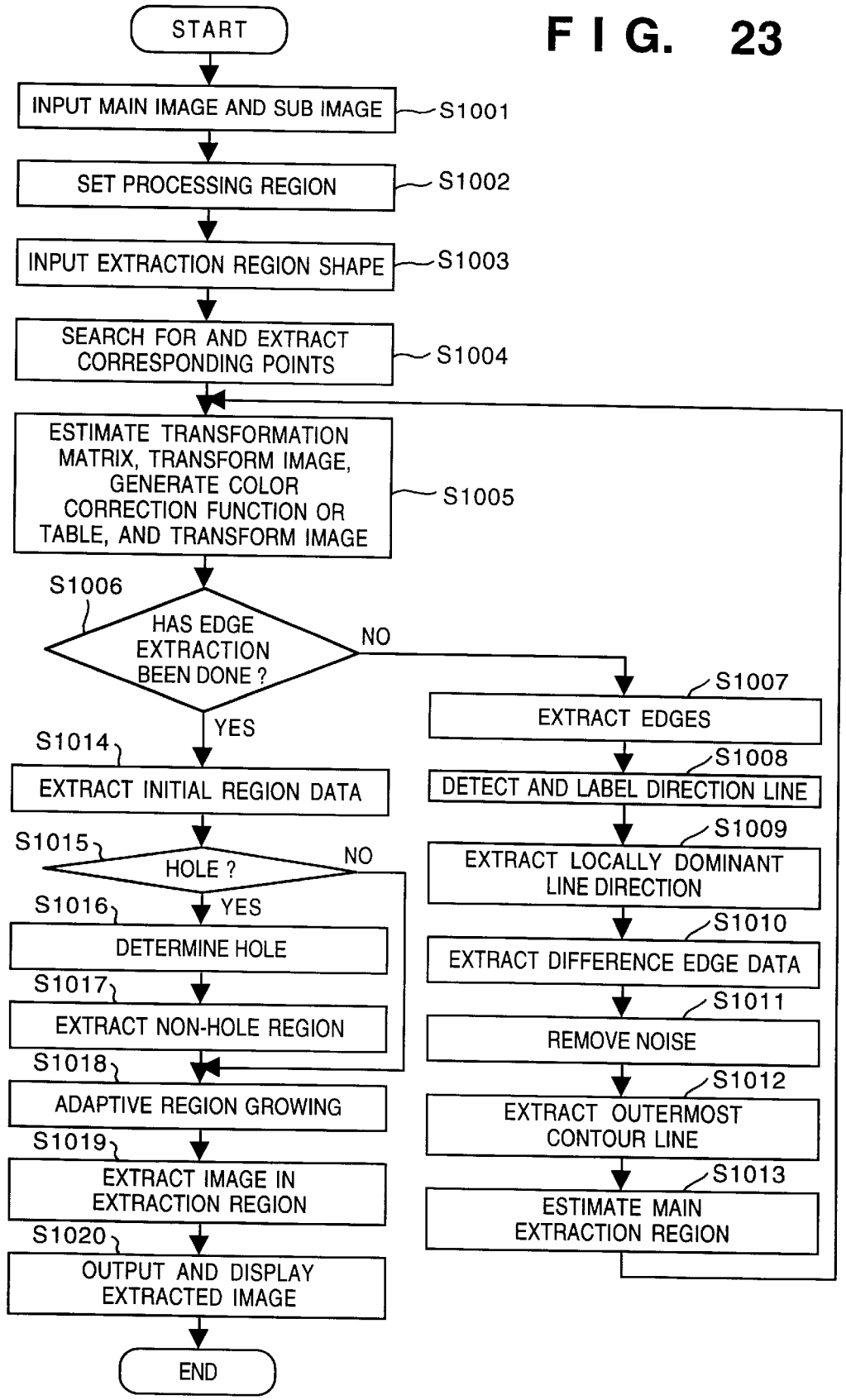
FIG. 23 is a flow chart showing the image extraction processing executed by the image processing apparatus according to the fifth embodiment of the present invention.

FIG. 22 shows the arrangement of an image processing apparatus according to the fifth embodiment of the present invention. The image processing apparatus according to the fifth embodiment of the present invention comprises an image input unit 1001, an image processing unit 1002, an image display unit 1014, and an instruction input unit 1017.

The image input unit 1001 comprises an optical imaging system including a lens, stop, and their driving control units, an image sensor, a video signal processing circuit, an image recorder, and the like. Of images input from the image input unit 1001, an input image including the object to be extracted, i.e., a subject, will be referred to as a main image hereinafter, and the image of a background alone without any subject image will be referred to as a sub image hereinafter.

The image processing unit 1002 comprises a temporary storage unit 1003 for temporarily storing the main and sub images, a corresponding point extraction unit 1007 for extracting corresponding points between a background image and input image, a transformation unit 1008 for geometrically transforming the background image on the basis of corresponding point data, estimating a color correction function of the background image on the basis of pixel value data (e.g., R, G, and B values and the like) of the corresponding points, and transforming the background image based on the estimated function, an edge intensity extraction unit 1004 for the two images, a difference edge extraction unit 1005, a noise removal unit 1006, an outermost contour line extraction unit 1009 for difference edges, a main extraction region estimation unit 1010, an initial region extraction unit 1011 based on thresholding of pixel value differences between the main and sub images, a hole determination unit 1015, a non-hole region extraction unit 1016, a processing mode control unit 1018, an extraction region determination unit 1012, and an extraction region image output unit 1013 for outputting an extraction region image to the image display unit 1014.

When the user informs a rough information associated with shape (e.g., the presence/absence of a hole) of the image region to be extracted, the processing mode control unit 1018 in the image processing unit 1002 controls the processing on the basis of the rough shape information. For example, when the presence of a hole is informed, the unit 1018 controls processing so that an initial region is extracted by the initial region extraction unit 1011 as in the fourth embodiment, and thereafter, hole determination is done by the hole determination unit 1015. On the other hand, when the absence of a hole is informed from the instruction input unit 1017, the initial region extraction result is directly output to the extraction region determination unit 1012. Note that the functions of the units except for the hole determination unit 1015, non-hole region extraction unit 1016, and processing mode control unit 1018 included in the image processing unit 1002 are the same as those in the fourth embodiment.

Note that the image processing unit 1002 may be an internal storage device, external storage device, or storage medium of a computer comprising a software program that can implement the processing to be described below, in place of the arrangement shown in FIG. 22. Similarly, the processing program may be stored in a gate array. Furthermore, the image processing unit 1002 may be built in the image input unit 1001.

The image input unit 1001 inputs a main image including a subject, and a sub image of a background alone without any subject image (step S1001). A processing region including the subject is set on the main image by automatic processing or a manual instruction unit such as a mouse or the like (step S1002). Furthermore, rough information associated with the shape of the subject (i.e., the extraction region) is input (step S1003).

The processing in the subsequent steps S1004 to S1014 are the same as that in steps S1203 to S1213 described above in the fourth embodiment, and a detailed description thereof will be omitted.

Figure 16:
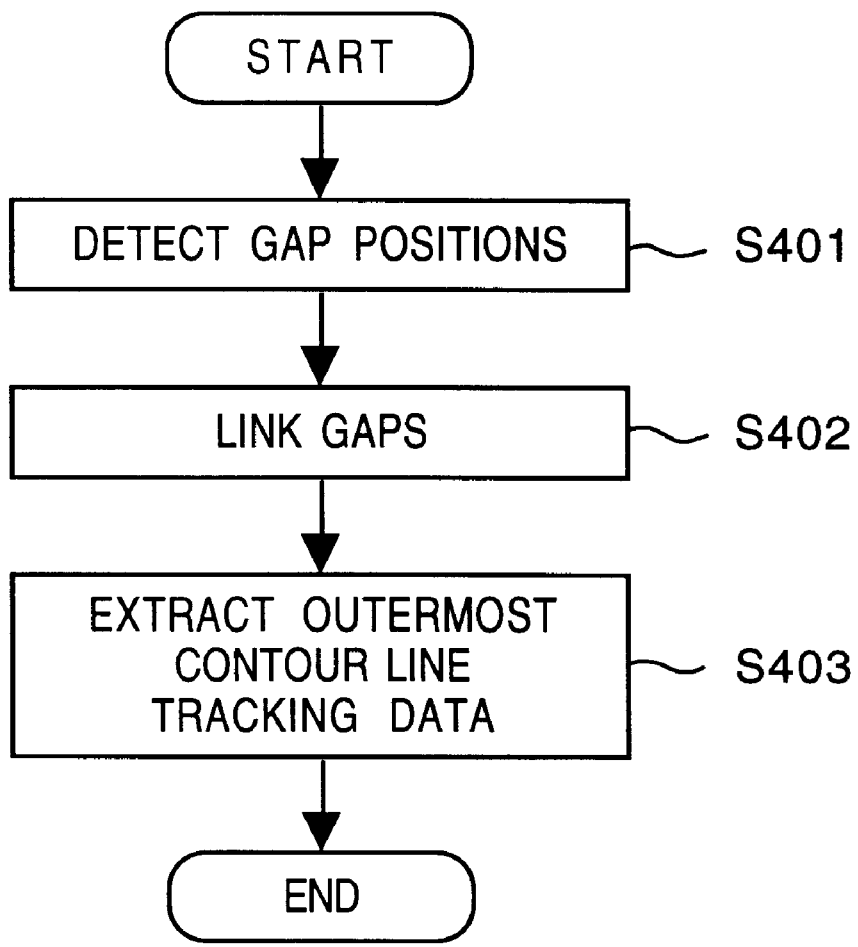
FIG. 16 is a flow chart for explaining the outermost contour line extraction processing of difference edge data.

Note that the processing in steps S401 to S403 and steps S4011 to S4013 described in detail above with reference to FIGS. 16 and 17 are done in step S1012.

In step S1015, a determination unit (not shown) checks if the user inputs the presence of a hole as the rough information associated with the shape of the extraction region in step S1003. If NO in step S1015, adaptive region growing (to be described later) is done (step S1018).

On the other hand, if YES in step S1015, the hole determination unit 1015 performs hole determination processing (step S1016), and the non-hole region extraction unit 1016 extracts a non-hole region (step S1017). As the hole determination method, a region which remains as a hole region in the initial region is determined as follows. That is, image data in the identical candidate hole region on the main and sub images are extracted, and their correlation value is calculated. If the calculation result is higher than a predetermined reference value, that hole is justified and determined as such, and hole determination data is generated and represented as binary data which assumes "1" at the respective points of a region determined as a hole, and "0" at the respective points on the non-hole region.

The extraction region determination unit 1012 performs adaptive region growing using the initial region as a seed (a region excluding the hole in case of the presence of a hole) inside the main extraction region (step S1018). More specifically, region growing of a portion extending from the main extraction region of the initial region and growing from a point on the boundary is completely suppressed, and its maximum region growing range is limited to inside the main extraction region.

In adaptive region growing, the similarity between image features of a point on the boundary of the initial region and a neighboring pixel (or region) is calculated, and if the calculated similarity is higher than a predetermined threshold value, each point on the boundary of the initial region is determined to be a point in an identical region to be extracted, and is merged in a mask region (extraction region).

Note that the feature parameters required in determination of similarity use brightness levels and hue values. However, the parameters are not limited to these values, and other features may be used. Merging in region growing need not always be done in units of pixels, but may be done in units of regions.

The threshold value in determination of similarity is set at spatially different values depending on the positions in an image on the basis of the hole determination data and edge distribution. For example, when a high threshold value is set inside the hole and a low threshold value is set outside the hole, growing from outside to inside the hole or vice versa can be suppressed. When the threshold value is similarly set at the edge position on the main image to be higher than that at a non-edge position, region growing beyond the edge can be suppressed. After the region growing, hole filling processing for automatically filling a hole having a predetermined size or less (in the region to be extracted) may be done.

The grown region obtained as a result of the above-mentioned processing is used as an extraction region, and the corresponding region is extracted from the main image (step S1019). The extraction region image output unit 1013 converts the extracted region into an appropriate data format and corrects its R, G, and B values for color matching. Thereafter, the unit 1013 outputs an extracted image, and the image display unit 1014 displays the output extracted image (step S1020), thus ending this processing.

In the processing in step S1019, a main image corresponding to the mask may be extracted after smoothing processing or correction processing of the boundary line of the region to be extracted.

In this embodiment, the presence/absence of a hole is used as rough information associated with the shape of the extraction region, but rough information of other shapes may be used and processing suitable for that information used may be done. The processing includes any processing executed inside the main extraction region and those using the outermost contour line of the difference edge data. Also, the adaptive region growing may be replaced by any processing for determining an extraction region on the basis of the initial region except for the hole region, and the main extraction region as in the fourth embodiment.

As described above, according to the fifth embodiment, in addition to the processing executed in the fourth embodiment, rough information associated with the shape of the subject (i.e., the extraction region) is input (step S1003). When the subject (i.e., the extraction region) has a hole, the hole determination unit 1015 performs hole determination processing (step S1016), and the non-hole region extraction unit 1016 extracts a non-hole region (step S1017). Hence, even when the specific image region to be extracted includes a hole region, the specific image region can be extracted with high precision. Also, by inputting a rough shape of the specific image region to be extracted, the specific image region can be precisely extracted at high speed.

SIXTH EMBODIMENT

Figure 24:
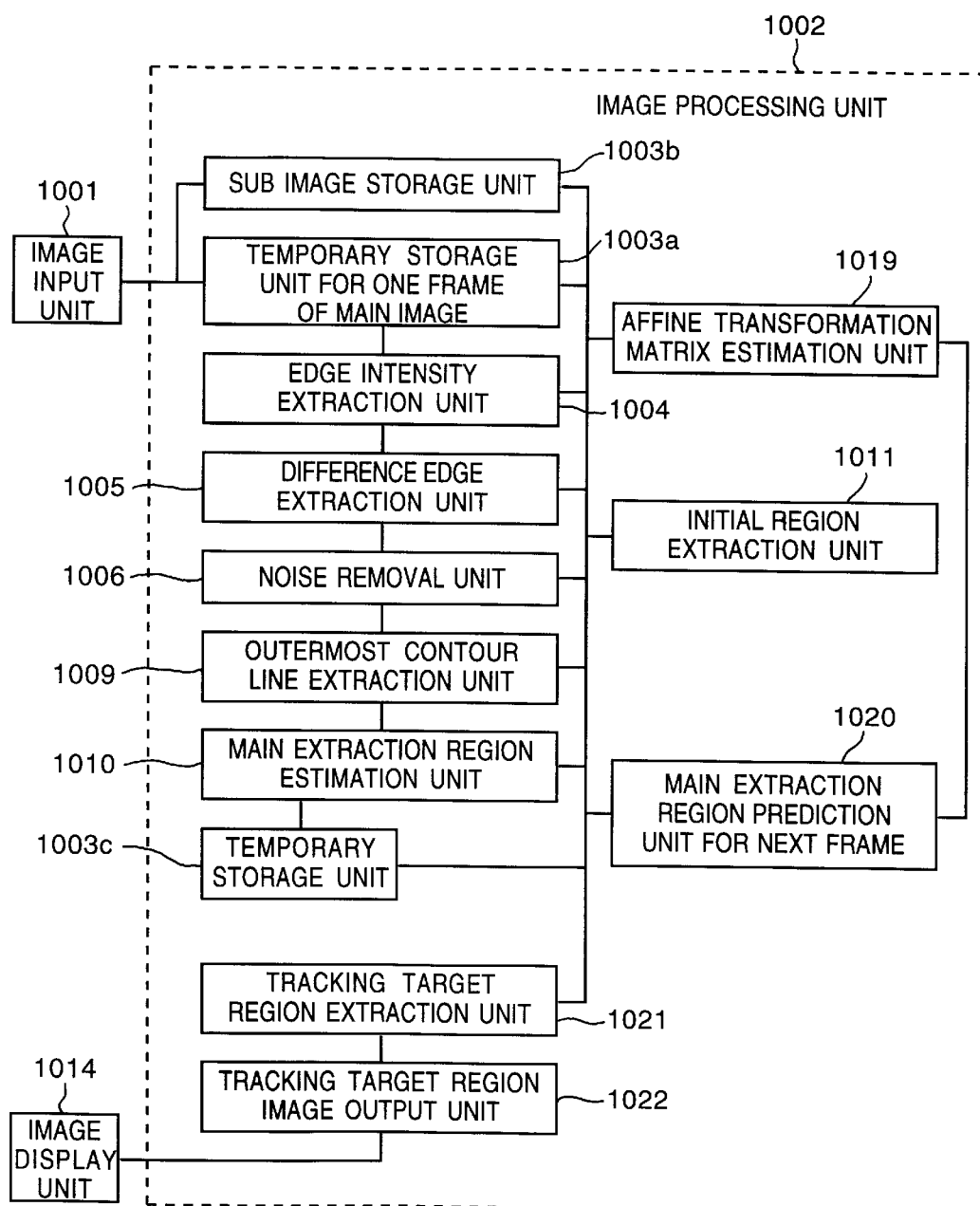
FIG. 24 is a block diagram showing the arrangement of an image processing apparatus according to the sixth embodiment of the present invention.

FIG. 24 shows the arrangement of an image processing apparatus according to the sixth embodiment of the present invention. The image processing apparatus according to the sixth embodiment of the present invention comprises an image input unit 1001, an image processing unit 1002, and an image display unit 1014.

The image input unit 1001 comprises an optical imaging system including a lens, stop, and their driving control units, an image sensor, a video signal processing circuit, an image recorder, and the like. The image input unit 1001 inputs a moving image as a main image, and a still image as a sub image.

The image processing unit 1002 comprises a temporary storage unit 1003a for storing a main image for one frame, a sub image storage unit 1003b, an affine transformation matrix estimation unit 1019, an edge intensity extraction unit 1004 for the two images, a difference edge extraction unit 1005, an initial region extraction unit 1011 based on thresholding of pixel value differences between the main and sub images, a noise removal unit 1006, an outermost contour line extraction unit 1009 for difference edges, a main extraction region estimation unit 1010, a temporary storage unit 1003c, a main extraction region prediction unit 1020 for the next frame, a tracing target region extraction unit 1021, and a tracing target region image output unit 1022 for outputting an extraction region image to the image display unit 1014.

In this embodiment, a moving image is input as the main image, a still image is input as the sub image, a specific target region is detected from the main image, and the detected region is tracked.

The storage units 1003a and 1003b store main image data for one frame, and sub image data, and the affine transformation matrix estimation unit 1019 estimates an affine transformation matrix for globally correcting translation components, rotation components, magnification variation components, and the like between the main and sub images (except for the object to be extracted), and local affine transformation coefficients for a region including a main extraction region and its surrounding portion in the previous frame. In this case, block matching or the like may be used as in the fourth embodiment, or when a background region except for a specific object is known, other methods, for example, motion vector estimation methods such as a gradient method, global affine transformation coefficient estimation method, and the like may be used.

Processing units mainly used from when difference edges are extracted from the main and sub images until the main extraction region is extracted, i.e., the edge intensity extraction unit 1004 for the two images, difference edge extraction unit 1005, noise removal unit 1006, outermost contour line extraction unit 1009 for the difference edges, and main extraction region estimation unit 1010 are the same as those in the fourth embodiment, and execute the same processing. Furthermore, the initial region extraction unit 1011 is the same as that described in the fourth embodiment. In this embodiment, the need for estimation of the affine transformation matrix and transformation is obviated as long as the view point position and viewing direction do not vary upon photographing or generating a main image.

The main extraction region prediction unit 1020 for the next frame predicts a main extraction region of the next frame on the basis of the main extraction region of the current frame and the main extraction region of the previous frame which is stored in the temporary storage unit 1003c. In this case, the main extraction region of the next frame is predicted by performing local affine transformation of at least points on the contour of the main extraction region of the current frame using the already estimated local affine transformation matrix of the main and sub images. As another method, local motion vectors may be obtained, and the positions of the individual points on the contour of the main extraction region of the next frame may be predicted.

The main extraction region estimation unit 1010 estimates a most likely main extraction region of the current frame using the main extraction region predicted using the previous frame, and the outermost contour line of difference edges obtained based on the current frame. For example, when the edges of the main image of the current frame are not present on the outermost contour line obtained by scanning the predicted main extraction region in the same manner as in the fourth embodiment, the outermost contour line position of the difference edge is determined as the estimated position of the main extraction region; otherwise, the predicted position is determined as the estimated position of the main extraction region.

Figure 25:
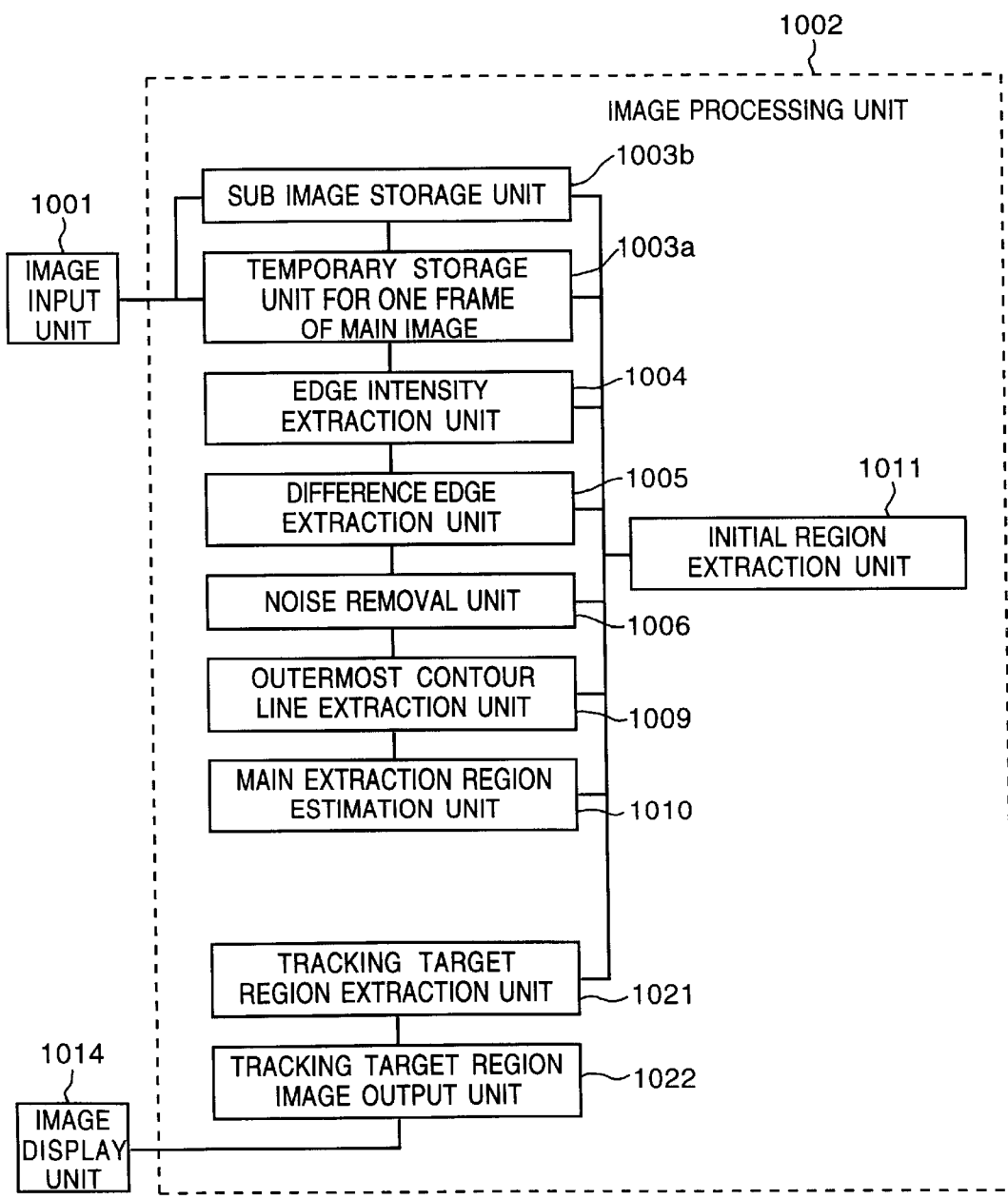
FIG. 25 is a block diagram showing the arrangement of an image processing apparatus according to the sixth embodiment of the present invention.

In this embodiment, although extraction precision deteriorates slightly, the main extraction region of the next frame may be directly estimated without any prediction for the main and sub images obtained at the fixed view point position. FIG. 25 shows the arrangement of a simplified image processing apparatus in this case. In this arrangement, the temporary storage unit 1003c, affine transformation matrix estimation unit 1019, and main extraction region prediction unit 1020 for the next frame are deleted from the arrangement shown in FIG. 24.

The processing of the tracing target region extraction unit 1021 and tracing target region image output unit 1022 is substantially the same as that executed by the extraction region determination unit 1012 and extraction region image output unit 1013 in the fourth embodiment.

As described above, according to the sixth embodiment, the same effects as in the fourth embodiment can be provided since a specific target region is detected from the main image in the same manner as in the fourth embodiment, although a moving image is input as the main image and a still image is input as the sub image unlike in the fourth embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image segmentation method for segmenting an object, which is not present in a reference image, from an input image including the object using the reference image, comprising:

the edge intensity distribution extraction step of extracting edge intensity distributions in the reference image and input image;

the direction-classified line detection step of detecting, in each of a plurality of blocks divided on an image screen, line components in terms of predetermined directions for edges in the reference image and input image on the basis of the extracted edge intensity distributions; and the image region specifying step of specifying an existence range of the object in the input image on the basis of a distribution of differences between the detected line components in each of said directions between the reference image and input image.

2. An image segmentation method for segmenting a predetermined image region from an input image input from an external device such as an image input device using a reference image, comprising:

the edge distribution extraction step of extracting edge distributions in the input image and reference image;

the direction-classified line detection step of detecting, in each of a plurality of blocks divided on an image screen, line distributions in terms of predetermined directions in the input image and reference image on the basis of the extracted edge distributions;

the singular edge extraction step of extracting a singular edge on the basis of a difference between the detected line distributions in each of said directions between the reference image and input image; and the image extraction step of extracting the predetermined image region in the input image on the basis of the extracted singular edge.

3. An image identification method for identifying an object, which is not present in a reference image, in an input image including the object using a standard model image representing a predetermined object and the reference image, comprising:

the edge intensity distribution extraction step of extracting edge intensity distributions in the reference image and input image;

the direction-classified line detection step of detecting, in each of a plurality of blocks divided on an image screen, line components in terms of predetermined directions for edges in the reference image and input image on the basis of the extracted edge intensity distributions;

the auto-framing step of specifying an existence range of the object in the input image on the basis of a distribution of differences between the detected line components in each of said directions between the reference image and input image; and the model size estimation step of estimating a size with respect to the standard model image on the basis of the specified existence range of the object, wherein a size of the standard model image is changed to the estimated size, and thereafter, the object is identified on the basis of similarity between the object image present in the existence range in the input image and the size-changed standard model image.

4. An image segmentation method for extracting an object, which is not present in a reference image, from an input image including the object using the reference image, comprising:

the edge intensity distribution extraction step of extracting edge intensity distributions in the reference image and input image;

the direction-classified line detection step of detecting, in each of a plurality of blocks divided on an image screen, line components in terms of predetermined directions for edges in the reference image and input image on the basis of the extracted edge intensity distributions;

the auto-framing step of specifying an existence range of the object in the input image on the basis of a distribution of differences between the detected line components in each of said directions between the reference image and input image; and the extraction processing step of performing extraction processing of the object within the specified existence range of the object.

5. An image segmentation method for segmenting an image region to be extracted from an input image using a reference image that represents a region approximating a remaining region excluding the image region, comprising:

the edge intensity distribution extraction step of extracting edge intensity distributions in the reference image and input image;

the direction-classified line detection step of detecting, in each of a plurality of blocks divided on an image screen, line components in terms of predetermined directions for edges in the reference image and input image on the basis of the extracted edge intensity distributions;

the singular contour extraction step of extracting a singular contour portion of the image region to be extracted on the basis of a distribution of differences between the detected line components in each of said directions in the reference image and input image; and the image extraction step of extracting the image region to be extracted on the basis of distribution data representing the extracted singular contour portion.

6. The method according to claim 5, wherein the image extraction step comprises:

the partial region extraction step of extracting a portion of the image region to be extracted as a partial region from the input image;

the region growing step of performing region growing by thresholding similarities between the extracted partial region as a seed and its neighboring regions; and the extraction step of extracting a region obtained by the region growth as the image region to be extracted.

7. The method according to claim 5, wherein the singular contour extraction step includes the step of extracting, as the singular contour portion, edges in the input image which have different line labels in terms of directions in identical neighboring regions of the input image and reference image.

8. The method according to claim 5, wherein the singular contour extraction step comprises:

the dominant line map extraction step of dividing the reference image into a plurality of blocks and detecting dominant line direction components in the blocks; and the line direction comparison step of comparing a label assigned to each of edges of the input image and the dominant direction line component in the block to which that edge belongs, and when the label assigned to the edge is different from the dominant direction line component in the block to which that edge belongs, the edge is extracted as the singular contour portion of the input image.

9. The method according to claim 5, wherein the image extraction step comprises:

the partial region extraction step of binarizing a portion of the image region to be extracted and extracting the binary data as mask data;

the smoothing step of smoothing the extracted mask data; and the singular contour restoration step of restoring the singular contour portion to mask data after the mask data is smoothed.

10. The method according to claim 5, wherein the singular contour extraction step includes the step of detecting a occluding boundary line serving as a boundary between the image region to be extracted, and the remaining region, and determining the detected occluding boundary line as the singular contour portion.

11. The method according to claim 10, wherein the singular contour extraction step comprises:

the dominant line map extraction step of segmenting the reference image into a plurality of blocks and detecting dominant line direction components in the blocks, a boundary point located in the vicinity of a boundary between a block without any dominant direction line component, and a block with the dominant direction line component among the blocks of the input image is extracted, and an edge of the input image located at a position closest to the boundary point in a predetermined local region including the boundary point is extracted as a portion of the occluding boundary line.

12. The method according to claim 6, wherein the region growing step includes the step of controlling the region growing so that a region growing direction from the edge substantially agrees with a label in units of directions of that edge.

13. An image segmentation method for segmenting an image region to be extracted from an input image using a reference image that represents a region approximating a remaining region excluding the image region, comprising:

the low-resolution image extraction step of extracting low-resolution image portions in the input image and reference image;

the image matching step of performing matching corresponding points between for the input image and reference image;

the dominant line map extraction step of segmenting the input image and reference image into a plurality of blocks an detecting, in each of a plurality of blocks divided on an image screen, dominant line direction components in the blocks; and the extraction step of extracting the image region on the basis of a degree of mating between a label in each of said directions of each edge of the input image and a label of the dominant line map of the reference image at the edge position.

14. The method according to claim 13, wherein the image matching step comprises:

the corresponding point extraction step of extracting corresponding points between the reference image and input image;

the first transformation step of geometrically transforming one of the input image and reference image on the basis of the extracted corresponding points; and the second transformation step of performing color correction of one of the input image and reference image, so that corresponding pixels in regions including the corresponding points have substantially equal gray levels after the geometric transformation.

15. The method according to claim 14, wherein the geometric transformation includes entire or local processing associated with at least one of a translation, rotation, magnification transformation, and perspective transformation.

16. An image segmentation apparatus for segmenting an image region to be extracted from an input image using a reference image that represents a region substantially equal to a remaining region excluding the image region, comprising:

storage means for storing the reference image;

edge extraction means for extracting edge distributions in the input image and reference image;

direction-classified line detection means for detecting, in each of a plurality of blocks divided on an image screen, line distributions in terms of directions in the input image and reference image on the basis of the extracted edge distributions;

corresponding point extraction means for extracting corresponding point information between the reference image and input image;

transformation means for geometrically transforming one of the input image and reference image on the basis of the extracted corresponding point information;

singular edge extraction means for extracting a singular edge on the basis of a line distribution difference in each of said directions between the geometrically transformed image, and the other image; and segmentation means for segmenting the image region to be extracted from the input image on the basis of the extracted singular edge.

17. The apparatus according to claim 16, wherein the geometric transformation includes entire or local processing associated with at least one of a translation, rotation, magnification transformation, and perspective transformation.

18. An image identification apparatus for identifying an object in an input image including the object which is not present in a reference image using a standard model image representing a predetermined object and the reference image, comprising:

edge intensity distribution extraction means for extracting edge intensity distributions in the reference image and input image;

direction-classified line detection means for detecting, in each of a plurality of blocks on an image screen, line components in terms of predetermined directions for edges in the reference image and input image on the basis of the extracted edge intensity distributions;

auto-framing means for specifying an existence range of the object in the input image on the basis of a distribution of differences between the detected line components in each of said directions between the reference image and input image; and model size estimation means for estimating a size with respect to the standard model image on the basis of the specified existence range of the object, wherein a size of the standard model image is changed to the estimated size, and thereafter, the object is identified on the basis of similarity between the object image present in the existence range in the input image and the size-changed standard model image.

* * * * *

UNITED STATES PATENT AND TRADEMARK OFFICE
CERTIFICATE OF CORRECTION

PATENT NO.     : 6,453,069 B1                                                Page 1 of 1
DATED          : September 17, 2002
INVENTOR(S)    : Masakazu Matsugu et al.

It is certified that error appears in the above-identified patent and that said Letters Patent is hereby corrected as shown below:

<u>Title page,</u>
Item [75], the address for inventor "Koji Hatanaka" should read -- Kanagawa-ken, Japan --.

<u>Column 43,</u>
Line 13, "degree of mating" should read -- degree of matching --

Signed and Sealed this

Second Day of December, 2003

JAMES E. ROGAN
*Director of the United States Patent and Trademark Office*